United States Patent
Kurasawa et al.

(10) Patent No.: US 10,379,652 B2
(45) Date of Patent: *Aug. 13, 2019

(54) SENSOR-EQUIPPED DISPLAY DEVICE AND SENSOR DEVICE

(71) Applicant: Japan Display Inc., Tokyo (JP)

(72) Inventors: Hayato Kurasawa, Tokyo (JP); Yasuyuki Teranishi, Tokyo (JP); Hiroshi Mizuhashi, Tokyo (JP); Koji Ishizaki, Tokyo (JP); Daisuke Ito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,169

(22) Filed: Sep. 4, 2018

(65) Prior Publication Data

US 2018/0373374 A1    Dec. 27, 2018

Related U.S. Application Data

(63) Continuation of application No. 15/424,079, filed on Feb. 3, 2017, now Pat. No. 10,095,338.

(30) Foreign Application Priority Data

Feb. 3, 2016   (JP) .................................. 2016-018948

(51) Int. Cl.
| | | |
|---|---|---|
| *G06F 3/041* | (2006.01) | |
| *G06F 3/044* | (2006.01) | |
| *G02F 1/1333* | (2006.01) | |
| *G02F 1/1343* | (2006.01) | |

(52) U.S. Cl.
CPC ........ *G06F 3/0412* (2013.01); *G02F 1/13338* (2013.01); *G06F 3/044* (2013.01); *G06F 3/0416* (2013.01); *G02F 1/134309* (2013.01); *G06F 2203/04112* (2013.01)

(58) Field of Classification Search
None
See application file for complete search history.

(56) References Cited

U.S. PATENT DOCUMENTS

| | | |
|---|---|---|
| 2008/0252608 A1 | 10/2008 | Geaghan |
| 2012/0092292 A1 | 4/2012 | Hayakawa |
| 2013/0222297 A1 | 8/2013 | Adachi |
| 2013/0278516 A1 | 10/2013 | Nagata et al. |
| 2013/0293491 A1 | 11/2013 | Doi et al. |
| 2013/0307793 A1 | 11/2013 | Song et al. |
| 2014/0063370 A1 | 3/2014 | Ko et al. |

FOREIGN PATENT DOCUMENTS

| | | |
|---|---|---|
| JP | 2012-084025 A | 4/2012 |
| JP | 2012-208749 A | 10/2012 |
| JP | 2014-010671 A | 1/2014 |

*Primary Examiner* — Nicholas J Lee
(74) *Attorney, Agent, or Firm* — Michael Best & Friedrich LLP

(57) ABSTRACT

According to one embodiment, a sensor-equipped display device includes first electrodes and a detection electrode. The first electrodes constitute sensor drive electrodes by being supplied with sensor drive signals separately and sequentially or sensor drive electrodes by simultaneously supplying the sensor drive signals to the first electrodes adjacent to each other. A width of the sensor drive electrode including the first electrode on the edge is smaller than a width of the other sensor drive electrode not including the first electrode on the edge.

13 Claims, 18 Drawing Sheets

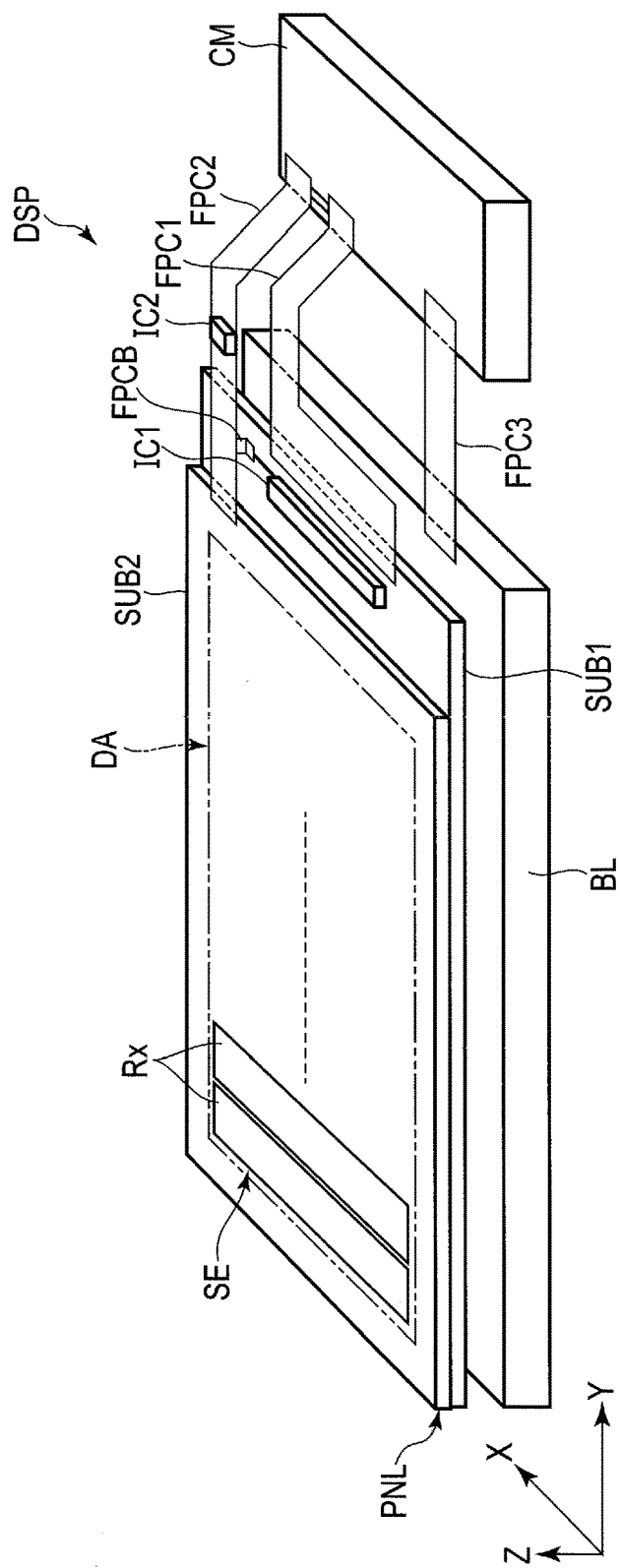
F I G. 1

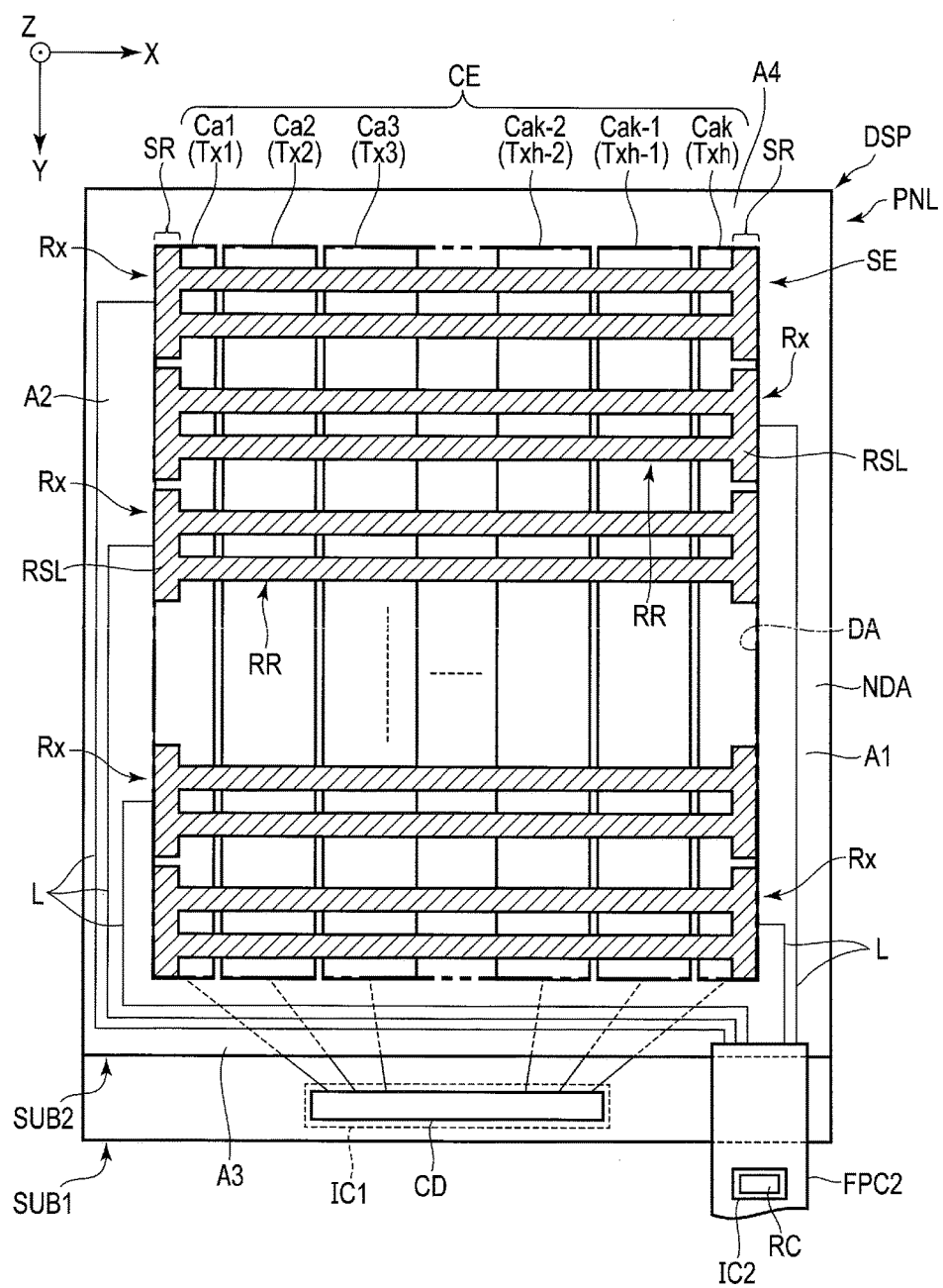
F I G. 5

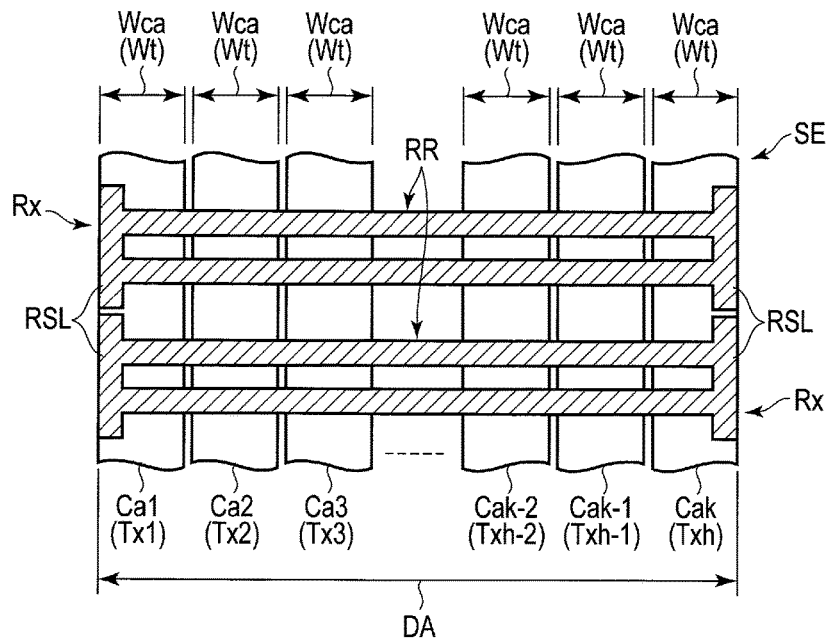
F I G. 11
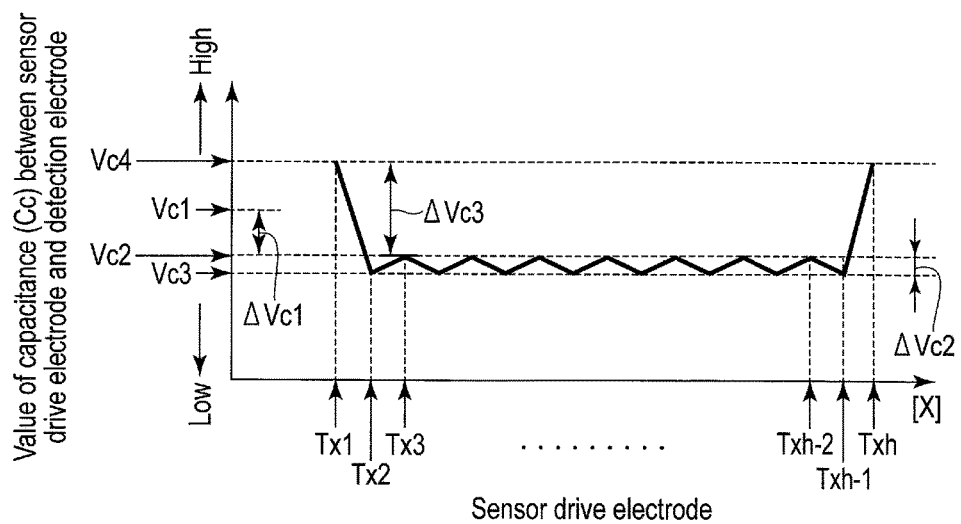
F I G. 12

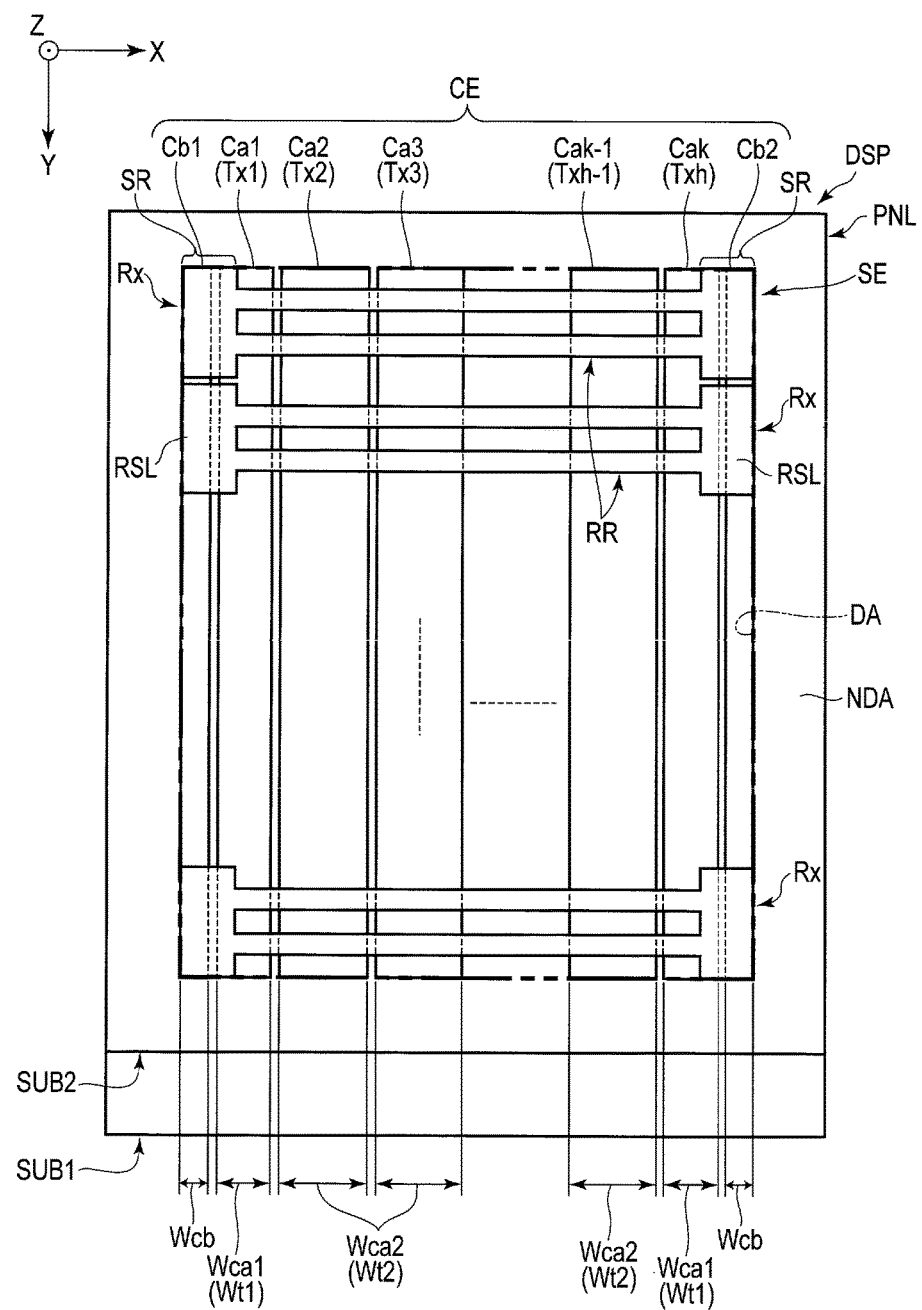
F I G. 20

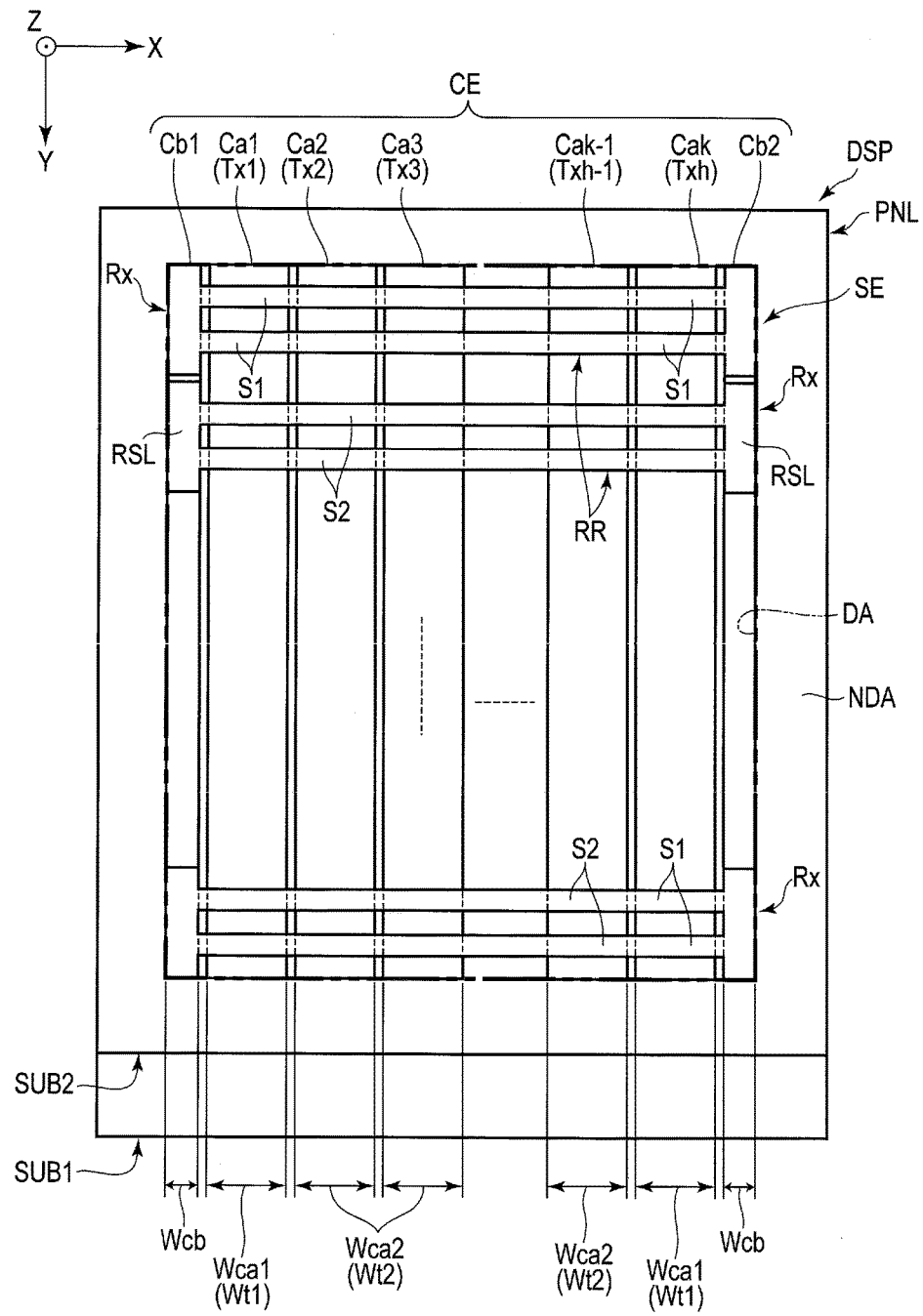
F I G. 21

| | Ca1 | Ca2 | Ca3 | Ca4 | Ca5 | Ca6 | | Cak-5 | Cak-4 | Cak-3 | Cak-2 | Cak-1 | Cak |
|---|---|---|---|---|---|---|---|---|---|---|---|---|---|
| Cb1 | | | | | | | | | | | | | |
| Tx1 | ○ | ○ | | | | | | | | | | | |
| Tx2 | | ○ | ○ | ○ | | | | | | | | | |
| Tx3 | | | | ○ | ○ | ○ | | | | | | | |
| | | | | | | | | | | | | | |
| Txh-2 | | | | | | | | ○ | ○ | ○ | | | |
| Txh-1 | | | | | | | | | | ○ | ○ | ○ | |
| Txh | | | | | | | | | | | | ○ | ○ |
| Cb2 | | | | | | | | | | | | | |

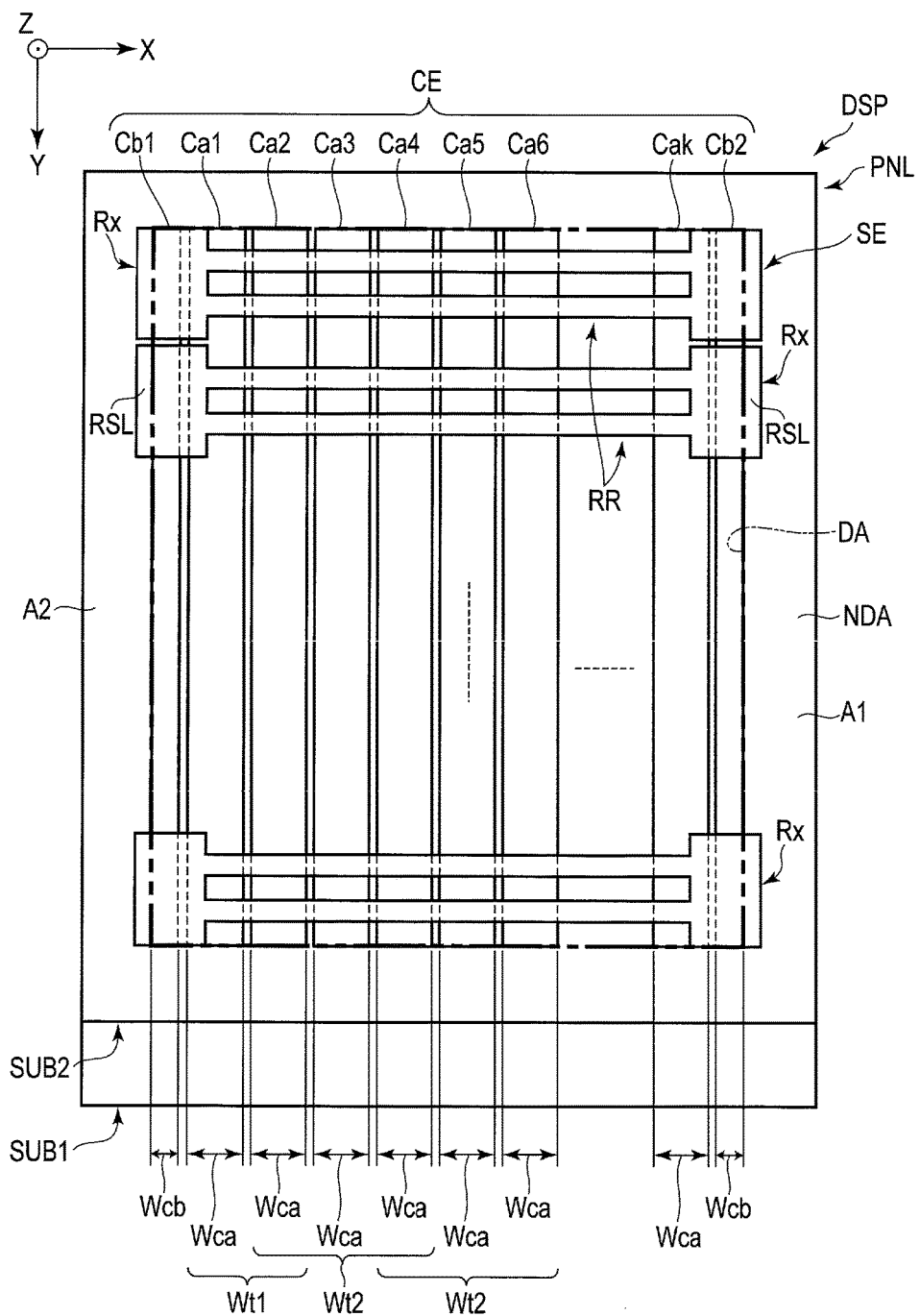
F I G. 23

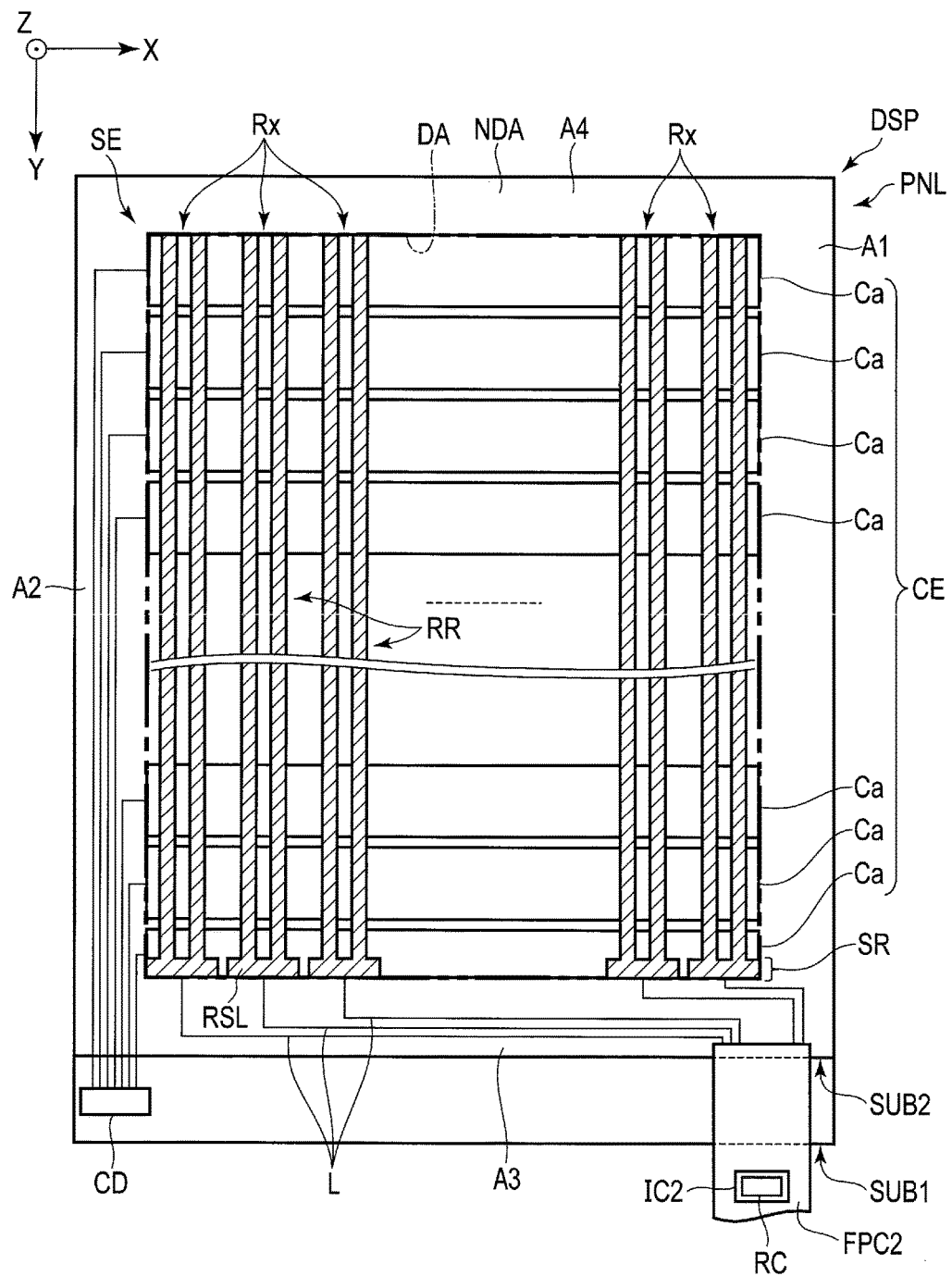
F I G. 25 though # US 10,379,652 B2

SENSOR-EQUIPPED DISPLAY DEVICE AND SENSOR DEVICE

CROSS-REFERENCE TO RELATED APPLICATIONS

This application is a Continuation of application Ser. No. 15/424,079, filed Feb. 3, 2017, which is based upon and claims the benefit of priority from Japanese Patent Application No. 2016-018948, filed Feb. 3, 2016, the entire contents of which are incorporated herein by reference.

FIELD

Embodiments described herein relate generally to a sensor-equipped display device and a sensor device.

BACKGROUND

As an example of sensor-equipped display devices, a capacitive sensor capable of detecting contact or approach of an object, based on a change in the electrostatic capacitance, has been recently developed. Detection electrodes and sensor drive electrodes constituting such a sensor are disposed in a display area where an image is displayed, and opposed to each other with dielectrics interposed between the electrodes. The detection electrodes are electrically connected to lead lines located outside the display area.

Demands for downsizing of the display device are increased while the display area is extended, and the periphery outside the display area tends to become a narrow frame. For this reason, sensor drive electrodes are often disposed closely to lead lines. In this case, the lead lines are considered to function as sensors by capacitive coupling between the sensor drive electrodes and the lead lines.

BRIEF DESCRIPTION OF THE DRAWINGS

FIG. 1 is a perspective view showing a configuration of a sensor-equipped liquid crystal display device of a first embodiment.

FIG. 5 is a plan view showing a configuration of a sensor of the first embodiment.

FIG. 11 is an enlarged plan view showing the sensor in part of the sensor-equipped liquid crystal display device of a comparative example of the first embodiment.

FIG. 12 is a line graph representing a value of capacitance between a sensor drive electrode and a detection electrode, in each sensor drive electrode of the comparative example.

FIG. 20 is a plan view showing a configuration of a sensor of a sensor-equipped liquid crystal display device of a third embodiment.

FIG. 21 is a plan view showing a configuration of a sensor of a sensor-equipped liquid crystal display device of a fourth embodiment.

FIG. 23 is a plan view showing a configuration of a sensor of a sensor-equipped liquid crystal display device of a fifth embodiment.

FIG. 25 is a plan view showing the configuration of the sensor-equipped liquid crystal display device of modified example 1 of the first embodiment.

DETAILED DESCRIPTION

Figure 2:
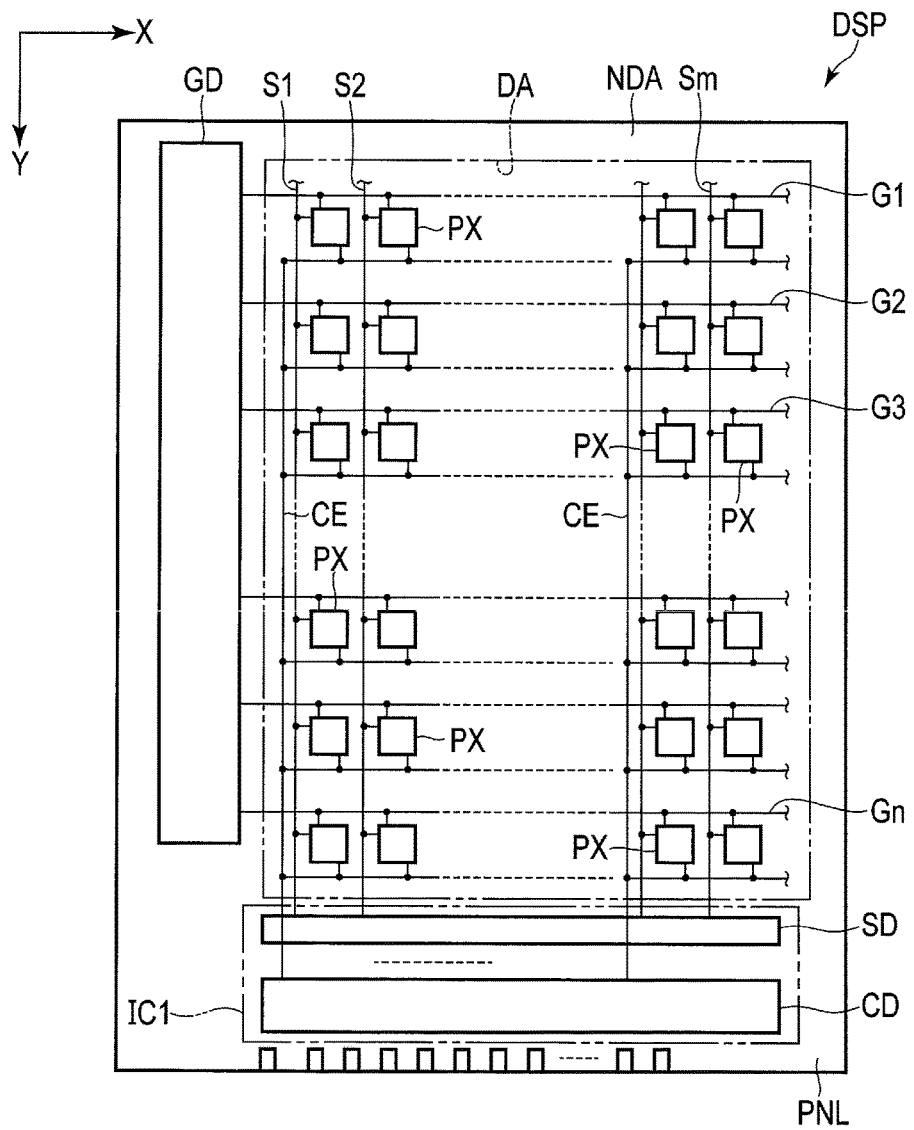
FIG. 2 is an illustration showing an equivalent circuit and a basic configuration of the liquid crystal display device shown in FIG. 1.

In general, according to one embodiment, there is provided a sensor-equipped display device, comprising: first electrodes disposed in a display area, arranged in a first direction and spaced apart from each other, and elongating in a second direction intersecting the first direction; and a detection electrode comprising a body portion opposed to the first electrodes, and an expanded portion which is opposed to the first electrode located on an outermost side, the expanded portion connected to the body portion and being wider than the body portion, the first electrodes constituting sensor drive electrodes by being supplied with sensor drive signals separately and sequentially or sensor drive electrodes by simultaneously supplying the sensor drive signals to the first electrodes adjacent to each other, a width of the sensor drive electrode including the first electrode on the edge being smaller than a width of the other sensor drive electrode not including the first electrode on the edge.

According to another embodiment, there is provided a sensor-equipped display device, comprising: first electrodes disposed in a display area, arranged in a first direction and spaced apart from each other, and elongating in a second direction intersecting the first direction; a second electrode disposed on an edge portion of the display area, elongating in the second direction, and being adjacent to and spaced apart from the first electrodes on edges located on outermost sides; a detection electrode comprising a body portion opposed to the first electrodes, and an expanded portion which is opposed to the second electrode, the detection electrode connected to the body portion and being wider than the body portion; and a controller urging the first electrodes to function as sensor drive electrodes by supplying sensor drive signals to the first electrodes separately and sequentially, or urging the first electrodes bundled adjacent to each other to function as sensor drive electrodes by simultaneously supplying sensor drive signals to the adjacent first electrodes, and maintaining an electric potential of the second electrode at a value different from electric potentials of the sensor drive electrodes in a sensing period for performing sensing using the detection electrode.

According to yet another embodiment, there is provided a sensor device, comprising: first electrodes arranged in a first direction and spaced apart from each other, and elongating in a second direction intersecting the first direction; and a detection electrode comprising a body portion opposed to the first electrodes, and an expanded portion which is opposed to the first electrode on an edge located on an outermost side, which is connected to the body portion, and which is wider than the body portion, the first electrodes constituting sensor drive electrodes by being supplied with sensor drive signals separately and sequentially or sensor drive electrodes formed of bundled first electrodes adjacent to each other being constituted by simultaneously supplying the sensor drive signals to the first electrodes adjacent to each other, in the sensor drive electrodes constituted in accordance with supply of the sensor drive signals, a width of the sensor drive electrode including the first electrode on the edge being smaller than a width of the other sensor drive electrode not including the first electrode on the edge.

According to yet another embodiment, there is provided a sensor device, comprising: first electrodes arranged in a first direction and spaced apart from each other, and elongating in a second direction intersecting the first direction; a second electrode disposed outside the first electrodes, elongating in the second direction, and being adjacent to and spaced apart from the first electrodes on edges located on outermost sides, of the first electrodes, in the first direction; a detection electrode comprising a body portion opposed to the first electrodes, and an expanded portion which is opposed to the second electrode, which is connected to the body portion and which is wider than the body portion; and a controller urging the first electrodes to function as sensor drive electrodes by supplying sensor drive signals to the first electrodes separately and sequentially, or urging the bundled first electrodes adjacent to each other to function as sensor drive electrodes by simultaneously supplying sensor drive signals to the adjacent first electrodes, and maintaining an electric potential of the second electrode at a value different from electric potentials of the sensor drive electrodes in a sensing period for performing sensing using the detection electrode.

Embodiments will be described hereinafter with reference to the accompanying drawings. The disclosure is a mere example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like of the respective parts are illustrated in the drawings schematically, rather than as an accurate representation of what is implemented, but such schematic illustration is merely exemplary and in no way restricts the interpretation of the invention. In the present specification and drawings, elements like or similar to those described in connection with preceding drawings may be denoted by like or similar reference numbers and their detailed descriptions may be omitted unless necessary.

First, a basic concept of the embodiments will be described.

Sensor-equipped display devices are configured to detect data input on a display surface by input means. The sensor is a capacitive sensor, which comprises a sensor drive electrode, a detection electrode disposed to be opposed to the sensor drive electrode, and a lead line connected to the detection electrode. A detected object such as a finger of a human and a stylus can be used as an input means.

Demands for making a frame region (non-display area) around the display area narrower in the display device are increased. Thus, a size of the frame region tends to be reduced in the display device. Thus, lead lines in the frame region are considered to be disposed closely to a sensor drive electrode.

When the sensor drive electrode and the lead lines are close to each other, a capacitive coupling (parasitic capacitance) is generated between the sensor drive electrode and the lead lines. As the sensor drive electrode and lead lines are disposed more closely, the parasitic capacitance becomes greater. For example, when a conductive material contacts or approaches the input surface of the display device in the proximity of the outermost periphery of the display area, the parasitic capacitance between the sensor drive electrode and the lead lines is varied and noise is caused to occur in the lead lines. In other words, not only a read signal indicative of a variation in the electrostatic capacitance (strength degree of the electrostatic capacitive coupling) of the detection electrodes, which should be transferred as a detection signal, but a noise signal generated in the lead lines by the parasitic capacitance, are transmitted to the lead lines. As the noise signal is greater, an amplitude ratio (S/N ratio) of these signals is consequently degraded.

Each of the detection electrodes therefore comprises a body portion opposed to the sensor drive electrode, and an expanded portionexpanded portion which is opposed to the sensor drive electrode and is wider than the body portion. At least a part of the expanded portion is disposed on a peripheral portion of the display area. The expanded portion can urge capacitance to be hardly formed between the sensor drive electrode and the lead lines through a gap in the body portion. Noise can be hardly generated in the lead lines and the degradation of the S/N ratio can be suppressed. Furthermore, arrangement of at least a part of the expanded portion in the display area can contribute to reduction in area of the frame region.

However, the expanded portion is overlaid on the sensor drive electrode located in the display area, in planar view. In the regions where the sensor drive electrode and the detection electrode are opposed, area of an overlaid portion of both the electrodes in the region where both the body portion and the expanded portion are opposed to the sensor drive electrode is larger than that in the region where the body portion alone is opposed to the sensor drive electrode. As a result, a capacitance of the region including the expanded portion becomes large. For this reason, keeping the capacitance between the sensor drive electrode and the detection electrode constant over the entire display area is difficult.

If the capacitance between the sensor drive electrode and the detection electrode is varied in a case where the conductive material contacts or approaches the input surface of the display device, as explained above, the variation amount of the capacitance generated at the detection electrode is varied in accordance with the location though the same conductive material is used. As a result, the detection accuracy may be varied in accordance with the location.

In the embodiments, the sensor-equipped display device and the sensor device capable of detecting input position information accurately can be provided by solving the problem. Alternatively, the sensor-equipped display device and the sensor device capable of suppressing the detection errors of the sensor can be obtained. Next, means and manners for solving the problem will be explained.

(First Embodiment)

First, a sensor-equipped display device of the first embodiment will be explained. The display device can be used for, for example, various devices such as a smartphone, a tablet terminal, a mobile telephone terminal, a personal computer, a TV receiver, a vehicle-mounted device, and a game console. In the present embodiment, a liquid crystal display device is described as an example of the sensor-equipped display device. FIG. 1 is a perspective view showing a configuration of the sensor-equipped liquid crystal display device of the present embodiment.

The major configuration explained in the present embodiment can also be applied to a self-luminous display device comprising an organic electroluminescent display element, and the like, an electronic paper display device comprising a cataphoretic element, and the like, a display device employing micro-electro-mechanical systems (MEMS), or a display device employing electrochromism.

As shown in FIG. 1, a liquid crystal display device DSP comprises an active-matrix display panel PNL, a driver IC chip IC1 which drives the display panel PNL, a capacitive sensor SE, a driver IC chip IC2 which drives the sensor SE, a backlight unit BL which illuminates the display panel PNL, a control module CM, flexible printed circuits FPC1, FPC2 and FPC3, and the like. In the present embodiment, the display panel PNL is a liquid crystal display panel.

The display panel PNL includes a first substrate SUB1 in a plate shape, a second substrate SUB2 in a plate shape which is opposed to the first substrate SUB1, and a liquid crystal layer (a liquid crystal layer LQ explained later) held between the first substrate SUB1 and the second substrate SUB2. The display panel PNL includes a display area DA in which an image is displayed. In the example illustrated, the display panel PNL is a transmissive display panel having a transmissive display function of displaying an image by urging light from the backlight unit BL to be transmitted selectively. The display panel PNL may be a reflective display panel having a reflective display function of displaying an image by urging external light and auxiliary light incident from the second substrate SUB2 side to be reflected selectively. In addition, the display panel PNL may be a transreflective display panel having the transmissive display function and the reflective display function.

The sensor SE comprises detection electrodes Rx. The detection electrodes Rx are disposed on, for example, the display surface of the display panel PNL, i.e., the outer surface of the second substrate SUB2. The detection electrodes Rx are illustrated schematically. In the example illustrated, the detection electrodes Rx extend substantially in a first direction X and are arranged in a second direction Y. The detection electrodes Rx may extend in the second direction Y and may be arranged in the first direction X. The first direction X and the second direction Y are orthogonal to each other. The first direction X and the second direction Y may intersect each other at an angle other than 90°. A third direction Z is orthogonal to each of the first direction X and the second direction Y.

The driver IC chip IC1 is mounted on the first substrate SUB1 of the display panel PNL. The flexible printed circuit FPC1 connects the display panel PNL with the control module CM. The flexible printed circuit FPC2 connects the detection electrodes Rx of the sensor SE with the control module CM. The driver IC chip IC2 is mounted on the flexible printed circuit FPC2. The driver IC chip IC2 may be mounted on the first substrate SUB1 or the control module CM. The flexible printed circuit FPC3 connects the backlight unit BL with the control module CM.

The driver IC chip IC1 and the driver IC chip IC2 are connected to each other via the flexible printed circuit FPC2 and the like. For example, if the flexible printed circuit FPC2 includes a branch portion FPCB connected to the first substrate SUB1, the driver IC chip IC1 and the driver IC chip IC2 may be connected to each other via lines included in the branch portion FPCB and lines on the first substrate SUB1. In addition, the driver IC chip IC1 and the driver IC chip IC2 may be connected to each other via lines included in each of the flexible printed circuit FPC1 and the flexible printed circuit FPC2. Either of the driver IC chip IC1 and the driver IC chip IC2 can generate a timing signal to notify a driving period of the sensor SE and supply the timing signal to the other driver IC chip. Either of the driver IC chips IC1 and IC2 can generate a timing signal to notify a driving period of a common electrode CE which will be explained later, and supply the timing signal to the other driver IC chip. Alternatively, the control module CM can supply the timing signals to the driver IC chip IC1 and the driver IC chip IC2. The timing signals can be used to synchronize the drive of the driver IC chip IC1 and the drive of the driver IC chip IC2.

FIG. 2 is a view showing the equivalent circuit and the basic configuration of the liquid crystal display device DSP shown in FIG. 1.

As shown in FIG. 2, the liquid crystal display device DSP comprises a source line driver SD, a gate line driver GD, a common electrode driver CD and the like, in a non-display area NDA outside the display area DA, besides the display panel PNL and the like. For example, at least the source line driver SD and the common electrode driver CD are partially built in the driver IC chip IC1. The non-display area NDA has a frame shape surrounding the display area DA.

The display panel PNL includes pixels PX in the display area DA. The pixels PX are disposed in an m×n matrix in the first direction X and the second direction Y where m and n are positive integers. The pixels PX arranged in the first direction X form pixel rows and the pixels PX arranged in the second direction Y form pixel columns. The display panel PNL also includes n gate lines G (G1 to Gn), m source lines S (S1 to Sm), a common electrode CE and the like in the display area DA.

The gate lines G extend in the first direction X to be drawn to the outside of the display area DA and are connected to the gate line driver GD. The gate lines G are arranged in the second direction Y to be spaced apart from each other. The source lines S extend in the second direction Y to be drawn to the outside of the display area DA and are connected to the source line driver SD. The source lines S are arranged in the first direction X to be spaced apart from each other, and intersect the gate lines G. The gate lines G and the source lines S may not necessarily extend linearly and may be partially bent. The common electrode CE is connected to the common electrode driver CD. The common electrode CE is shared by the pixels PX. Details of the common electrode CE will be described later.

Figure 3:
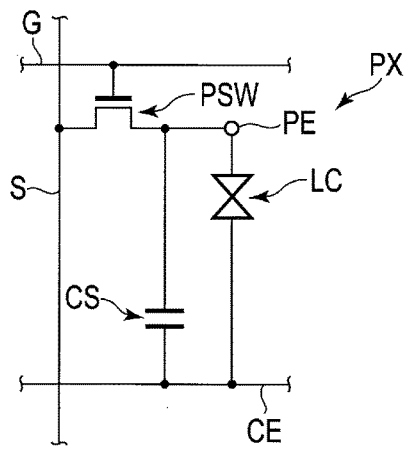
FIG. 3 is an equivalent circuit diagram of a pixel shown in FIG. 2.

FIG. 3 is an equivalent circuit diagram showing one of the pixels PX shown in FIG. 2.

As shown in FIG. 3, each pixel PX comprises a switching element PSW, a pixel electrode PE, the common electrode CE, a liquid crystal layer LC, and the like. The switching element PSW is composed of, for example, a thin thin-film transistor. The switching element PSW is electrically connected to the gate line G and the source line S. The switching element PSW may be in a top gate type or a bottom gate type. A semiconductor layer of the switching element PSW is formed of, for example, polycrystalline silicon but may be formed of amorphous silicon, an oxide semiconductor or the like. The pixel electrode PE is electrically connected to the switching element PSW. The pixel electrode PE is opposed to the common electrode CE. A storage capacitor CS is formed, for example, between the common electrode CE and the pixel electrode PE.

Figure 4:
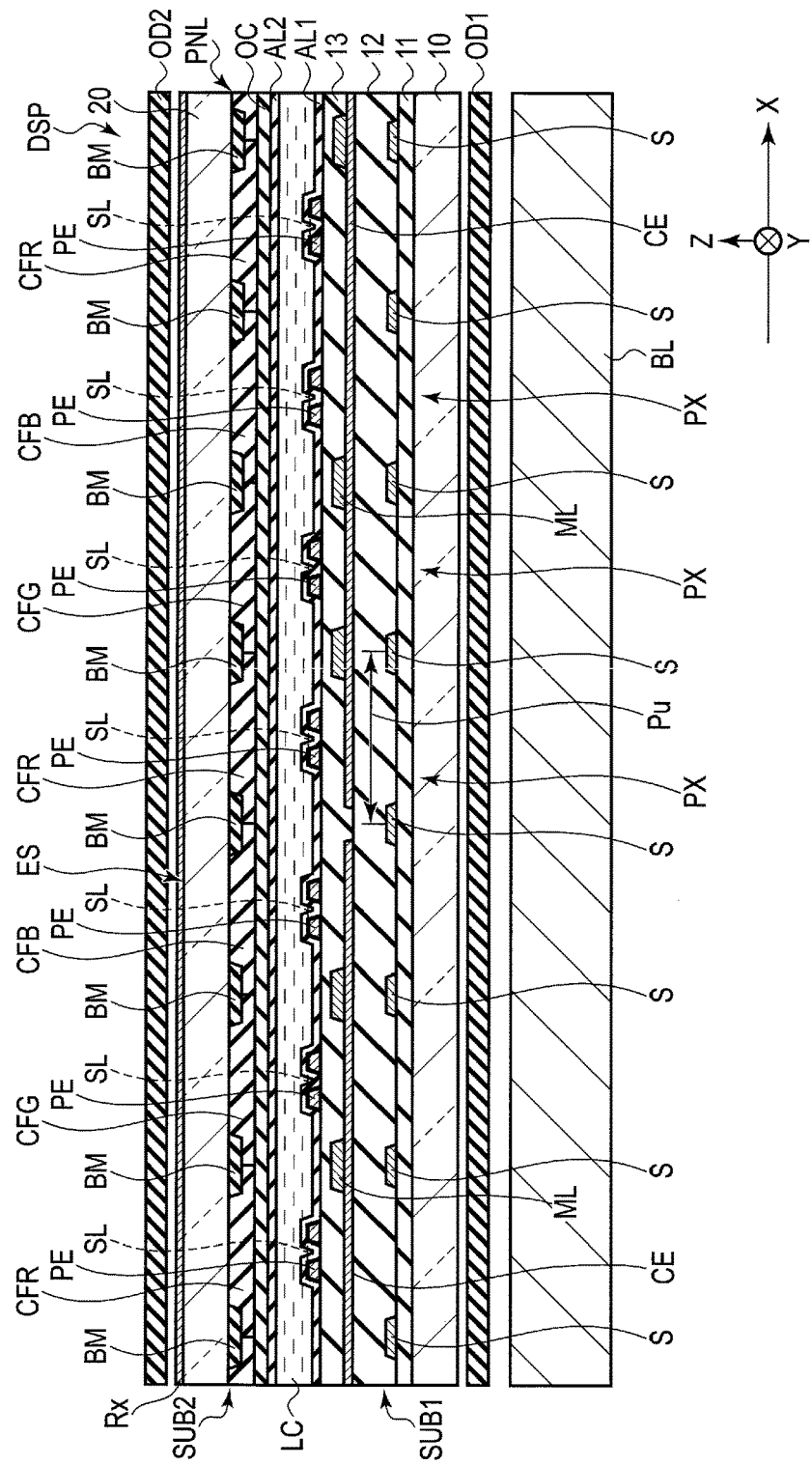
FIG. 4 is a cross-sectional view schematically showing a structure of the liquid crystal display device in part.

FIG. 4 is a cross-sectional view showing a part of the structure of the liquid crystal display device DSP.

As shown in FIG. 4, in the present embodiment, the display panel PNL may be configured to correspond to any one of a display mode using a longitudinal electric field along a normal line of a main surface of the substrate, a display mode using an oblique electric field angled with respect to the normal line of the main surface of the substrate, and a display mode using a lateral electric field along the main surface of the substrate. In addition, the display panel PNL may be configured to correspond to a display mode using an arbitrary combination of the longitudinal, lateral, and oblique electric fields. The main surface of the substrate indicates a surface parallel to an X-Y plane defined by the first direction X and the second direction Y that are orthogonal to each other. In the display mode using the longitudinal electric field or the oblique electric field, for example, the pixel electrodes PE are disposed on the first substrate SUB1 while the common electrode CE is disposed on the second substrate SUB2. In the display mode using the lateral electric field, the pixel electrodes PE and the common electrode CE are disposed on the first substrate SUB1.

In the example illustrated, the display panel PNL is configured to correspond to the display mode using the lateral electric field. A second substrate SUB2 is opposed to the first substrate SUB1 and spaced apart from the first substrate SUB1 with a predetermined gap, on the display panel PNL. The liquid crystal layer LC is located in the gap between the first substrate SUB1 and the second substrate SUB2.

The first substrate SUB1 includes a first insulating substrate 10 having a light transmitting property of a glass substrate or a resin substrate. The first substrate SUB1 includes the gate lines, the switching elements, the source lines S, the common electrode CE, the pixel electrodes PE, a first insulating film 11, a second insulating film 12, a third insulating film 13, a first alignment film AL1 and the like, on an upper side of the first insulating substrate 10, i.e., the side opposed to the second substrate SUB2.

Each pixel electrode PE is located between adjacent source lines S and opposed to the common electrode CE via the insulating film. In addition, each pixel electrode PE includes a slit SL at a position opposed to the common electrode CE. The common electrode CE and the pixel electrodes PE are formed of, for example, a transparent, electrically conductive material such as ITO or IZO. The first alignment film AL1 is formed on the pixel electrodes PE and the third insulating film 13 to cover the pixel electrodes PE and the third insulating film 13.

The common electrode CE is thus located in a layer different from the layer of the gate lines G and the source lines S, or the pixel electrodes PE. For this reason, the common electrode CE can be disposed in a positional relationship of intersecting the gate lines G and the source lines S, or the pixel electrodes PE in the X-Y plane, in planar view. In other words, the common electrode CE can be disposed across the adjacent pixels PX. In the present embodiment, the common electrode CE is formed in a strip shape, extends in the second direction Y, and has a width which enables the common electrode to be opposed to the pixel columns.

The second substrate SUB2 includes a second insulating substrate 20 having a light transmitting property of a glass substrate or a resin substrate. The second substrate SUB2 includes a light-shielding layer BM, color filters CFR, CFG and CFB corresponding to red, green and blue colors, an overcoat layer OC, a second alignment film AL2 and the like, on a lower side of the second insulating substrate 20, i.e., the side opposed to the first substrate SUB1. The light-shielding layer BM is located on an inner surface of the second insulating substrate 20 to partition the pixels. Each of the color filters CFR, CFG, and CFB is located on the inner surface of the second insulating substrate 20 and partially overlaid on the light-shielding layer BM.

In the example illustrated, a unit pixel, which is the minimum unit of a color image, is composed of three color pixels, i.e., the red pixel, the green pixel, and the blue pixel. However, the unit pixel is not limited to a combination of three color pixels as explained above. For example, the unit pixel may be composed of four color pixels, i.e., the red pixel, the green pixel, the blue pixel and a white pixel. In this case, a white or transparent color filter may be disposed on the white pixel or the color filter of the white pixel may be omitted. The overcoat layer OC covers the color filters CFR, CFG, and CFB. The overcoat layer OC is formed of a transparent resin material. The second alignment film AL2 covers the overcoat layer OC.

The liquid crystal layer LC functions as a display function layer of operating in accordance with electric fields generated between the common electrode CE and the pixel electrodes PE. The common electrode CE, the pixel electrodes PE, the liquid crystal layer LC and the like are located between a pair of substrates, i.e., the first insulating substrate 10 and the second insulating substrate 20.

The detection electrodes Rx are located on the outer surface ES side of the second insulating substrate 20. In the example illustrated, the detection electrodes Rx are in contact with the outer surface ES of the second insulating substrate 20, but an insulating member may be interposed between the detection electrodes Rx and the outer surface ES. Details of the structure of the detection electrodes Rx will be explained later. The illustration is simplified, and lead lines L and the like which will be explained later are not illustrated. The detection electrodes Rx are formed of, for example, a metal material such as aluminum, which will be explained later. The time required for detection can be reduced by lowering the electric resistance value of the detection electrodes Rx. For this reason, use of metal detection electrodes Rx is beneficial for achievement of a larger size and a higher fineness of the display panel PNL.

The detection electrodes Rx may also be formed of a combination (assembly) of a transparent conductive material (for example, a strip-shaped conductive layer) such as ITO or IZO, and a metal material (for example, a fine metal line). Each detection electrode Rx is opposed to the common electrode CE via dielectric members such as the third insulating film 13, the first alignment film AL1, the liquid crystal layer LC, the second alignment film AL2, the overcoat layer OC, the color filters CFR, CFG and CFB, and the second insulating substrate 20.

The first optical element OD1 is interposed between the first insulating substrate 10 and the backlight unit BL. The second optical element OD2 is disposed above the detection electrode Rx. Each of the first optical element OD1 and the second optical element OD2 includes at least a polarizer and may include a retardation film as needed. The polarizers included in the first optical element OD1 and the second optical element OD2 are disposed to have a crossed-Nicol relationship in which absorption axes of the respective polarizers intersect each other.

The second optical element comprises a conductive layer opposed to the detection electrodes to cover the display area.

Next, a sensor SE mounted on the liquid crystal display device DSP of the present embodiment will be explained. FIG. 5 is a plan view showing a configuration of the sensor SE of the present embodiment.

As shown in FIG. 5, in the present embodiment, the sensor SE comprises the common electrode CE of the first substrate SUB1 and the detection electrodes Rx of the second substrate SUB2. In other words, the common electrode CE functions as an electrode for display by generating an electric field between the common electrode CE and the pixel electrodes PE. The common electrode CE also functions as a sensor drive electrode by generating capacitance between the common electrode CE and the detection electrodes Rx.

The common electrode CE is disposed in the display area DA. In the example illustrated, the common electrode CE includes first electrodes Ca. The first electrodes Ca are arranged in the first direction X to be spaced apart from each other, in the display area DA. Each of the first electrodes Ca has a strip shape and elongates in the second direction Y.

The first electrodes Ca constitute sensor drive electrodes Tx by being supplied with sensor drive signals from a controller, sequentially and independently. The sensor SE comprises the sensor drive electrodes Tx and the detection electrodes Rx. In the present embodiment, the sensor drive electrodes Tx are h sensor drive electrodes Tx1, Tx2, . . . Txh including a first sensor drive electrode Tx1 to h-th sensor drive electrode Txh.

The common electrode CE includes k first electrodes Ca (Ca1, Ca2, . . . Cak). Each of h and k indicates a natural number greater than or equal to two. In the present embodiment, each sensor drive electrode Tx is composed of a corresponding first electrode Ca (h=k).

Each detection electrode Rx comprises an expanded portion RSL and a body portion RR. The expanded portions RSL are arranged in the second direction Y. At least a part of the expanded portion RSL is disposed in the display area DA. In the present embodiment, the entire bodies of the expanded portions RSL are disposed in the display area DA. The detection electrode Rx comprises two expanded portions RSL, and the body portion RR is sandwiched between two expanded portions RSL in the first direction X. The body portions RR are disposed in the display area DA and arranged in the second direction Y. Each of the body portions RR elongates in a strip shape, in the first direction X. In other words, the body portion RR elongates in a direction intersecting the first electrodes Ca. The body portion RR is macroscopically formed in a strip shape as illustrated but, microscopically, the body portion RR is composed of an assembly of fine metal lines as explained later. In addition, the expanded portion RSL is macroscopically formed in a square shape as illustrated but, microscopically, the expanded portion RSL is composed of an assembly of fine metal lines as explained later or a strip-shaped metal film and the like.

In the non-display area NDA, a strip-shaped area disposed on the right side of the second substrate SUB2 to elongate in the second direction Y is referred to as a first area A1, a strip-shaped area disposed on the left side of the second substrate SUB2 to elongate in the second direction Y is referred to as a second area A2, a strip-shaped area disposed on the lower side of the second substrate SUB2 to elongate in the first direction X is referred to as a third area A3, and a strip-shaped area disposed on the upper side of the second substrate SUB2 to elongate in the first direction X is referred to as a fourth area A4.

The expanded portions RSL arranged in the second direction Y form an expanded portion group SR which will be described later in detail. In the example illustrated, the expanded portions RSL are arranged on right and left end portions of the display area DA elongating in the first area A1 and the second area A2. The illustration is simplified, but a gap between the adjacent expanded portions RSL is small and each of the expanded portions RSL is configured to suppress leakage of the electric field which will be explained later.

The display panel PNL includes lead lines L besides the common electrode CE and the detection electrodes Rx. The lead lines L are disposed in the non-display area NDA and located in the same plane as the detection electrodes Rx, on the second substrate SUB2. The lead lines L are electrically connected to the expanded portions RSL of the detection electrodes Rx in a one-to-one correspondence. The lead lines L output sensor output values from the detection electrodes Rx, respectively.

In the example illustrated, the lead lines L are disposed in the first area A1, or the second area A2 and the third area A3, on the second substrate SUB2. For example, amongst the detection electrodes Rx arranged in the second direction Y, the lead lines L connected to the odd-numbered detection electrodes Rx are disposed in the second area A2 and the third area A3, and the lead lines L connected to the even-numbered detection electrodes Rx are disposed in the first area A1. The above-described layout of the lead lines L corresponds to the uniform width in the first direction X of the first area A1 and the second area A2 and to the narrow frame of the liquid crystal display device DSP.

It should be noted that the layout of the lead lines L is not limited to the example illustrated. For example, a layout in which the lead lines L connected to the detection electrodes Rx in the upper part of the display area DA are located in the first area A1, and the lead lines L connected to the detection electrodes Rx in the lower part of the display area DA are located in the second area A2 and the third area A3, may be adopted.

The expanded portion group SR on the left side is opposed to a side edge portion on the second area A2 side of the first electrode Ca1 at the left end, in planar view. In the present embodiment, the side edge of the left-side expanded portion group SR which is on the second area A2 side, and the side edge of the left-end first electrode Ca1 which is on the second area A2 side extend along a boundary between the display area DA and the non-display area NDA, and said side edge of the left-side expanded portion group SR is in line with said side edge of the left-end first electrode Ca1 in the third direction Z.

The right-side expanded portion group SR is constituted similarly to the left-side expanded portion group SR.

Each of the first electrodes Ca is electrically connected to the common electrode driver CD. For example, at least a part of the common electrode driver CD is built in the driver IC chip IC1 but is not limited to this example. For example, the common electrode driver CD may be disposed outside the driver IC chip IC1. The common electrode driver CD functions as a driving module configured to supply a common drive signal to the common electrode CE at the display drive of displaying the images, and to supply a sensor drive signal to the common electrodes CE at the sensing drive for sensing.

The flexible printed circuit FPC2 is connected to the second substrate SUB2 and also electrically connected to each of the lead lines L, in the non-display area NDA on the lower side (i.e., the side close to the driver IC chip IC1) of the drawing. The detection circuit RC is built in, for example, the driver IC chip IC2. The sensor drive signal from the common electrode CE is received as the detection signal by the detection electrodes Rx, and the detection circuit RC reads as sensor output values the variation in the detection signals supplied from the detection electrodes Rx via the lead lines L connected to the detection electrodes Rx. The detection circuit RC having such a function detects contact or approach of a detected object to the liquid crystal display device DSP, based on the sensor output values from the detection electrodes Rx. Furthermore, the detection circuit RC can also detect position information about the portion which the detected object contacts or approaches. The detection circuit RC may be disposed in the control module CM.

Figure 6:
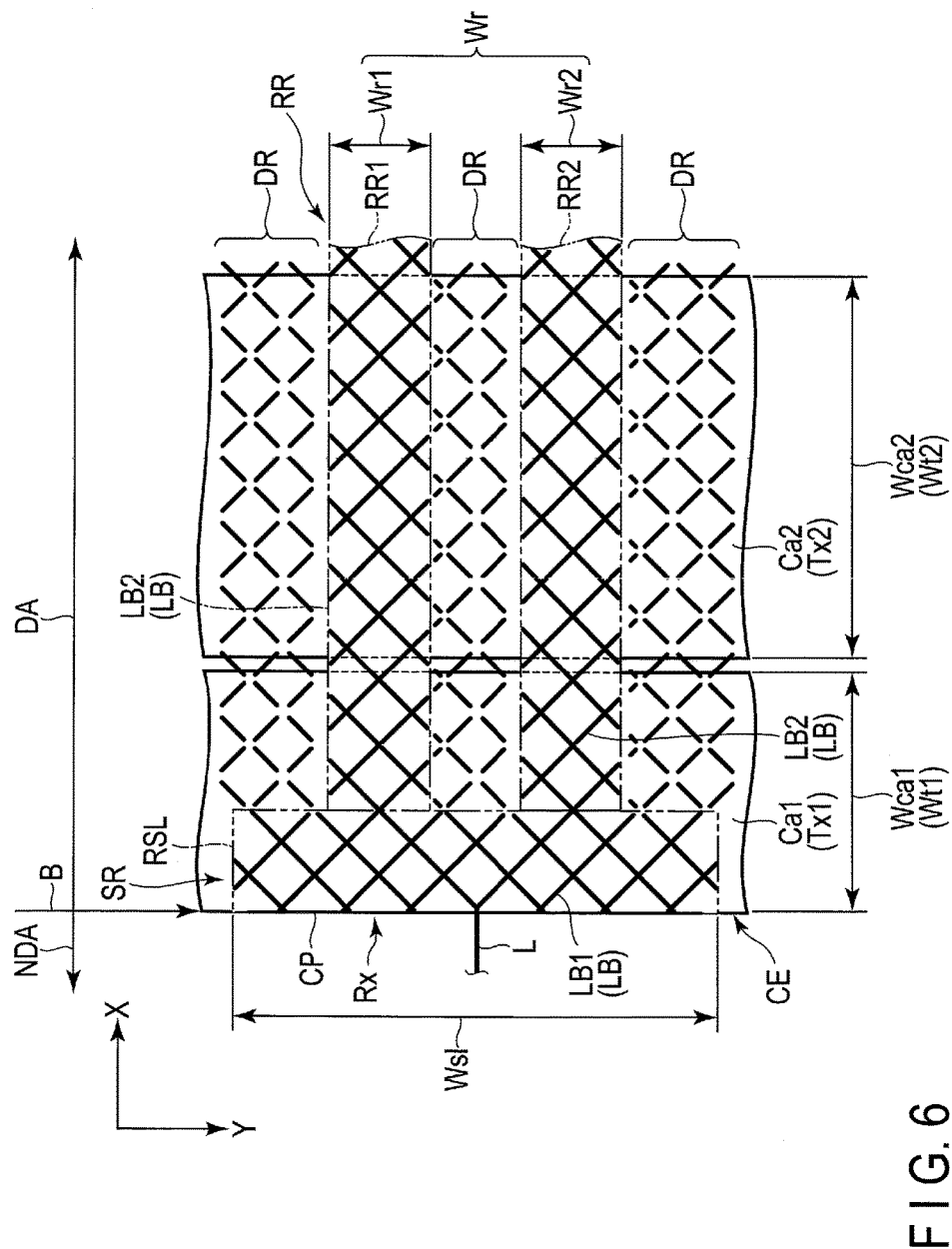
FIG. 6 is an enlarged plan view showing the sensor in part.

FIG. 6 is an enlarged plan view showing a part of the sensor SE shown in FIG. 5.

As shown in FIG. 6, the first electrodes Ca of the common electrode CE are arranged in the first direction X, in the display area DA. Each of the first electrodes Ca has a first width Wca in the first direction X. The first width Wca is a distance between long sides of the strip-shaped first electrodes Ca and is constant along a length direction of the first electrodes Ca. Desirably, however, the first width Wca is an integer multiple of a pixel pitch Pu which extends in the first direction X of the pixel PX. The pixel pitch Pu is a pitch in the first direction X of the centers of source lines S shown in FIG. 4. The pixel pitch Pu is not particularly limited but, in the present embodiment, the pixel pitch Pu is in a range of 30 to 60 μm.

A first width Wca1 of the first electrodes Ca1 and Cak on the outermost edges, of the first widths Wca of the respective first electrodes Ca, is smaller than a first width Wca2 in the first direction X of each of the other first electrodes Ca (Ca2, Ca3, . . . Cak-1). In the present embodiment, the first electrode Ca1 on the left edge and the first electrode Cak on the right edge have the same first width Wca1. The first electrodes Ca (Ca2, Ca3, . . . Cak-1) at the positions other than the edges have the same first widths Wca2.

In the present specification, the same widths indicate that the widths are completely the same. Furthermore, this also indicates that a difference in number of the pixels PX arranged in the first direction X, of the pixels PX using the first electrodes Ca, is smaller than or equal to three. Moreover, this also indicates that a difference in widths in the first direction X of the first electrodes Ca is smaller than or equal to 180 μm.

In the present embodiments, the first widths Wca1 of the respective first electrodes Ca1 and Cak on both the edges are completely the same as each other. The first widths Wca2 of the respective first electrodes Ca (Ca2, Ca3, . . . Cak-1) at the positions other than the edges are completely the same as each other.

In addition, each sensor drive electrode Tx of the present embodiment is composed of one first electrode Ca. For example, the first sensor drive electrode Tx1 is composed of the first electrode Ca1 on the edge.

In the present embodiment, the first sensor drive electrode Tx1 comprising the first electrode Ca1 on the edge and the h-th sensor drive electrode Txh comprising the first electrode Cak on the edge, of the sensor drive electrodes Tx, have the same shape and the same size. The second sensor drive electrode Tx2 to the h-1-th sensor drive electrode Txh-1 not including the first electrodes Ca1 and Cak on the edges, of the sensor drive electrodes Tx, have a different shape and a different size from each of the first sensor drive electrode Tx1 and the h-th sensor drive electrode Txh. In addition, a drive width Wt of each of the first sensor drive electrode Tx1 and the h-th sensor drive electrode Txh is referred to as a first drive width Wt1 and a drive width Wt of each of the second sensor drive electrode Tx2 to the h-1-th sensor drive electrode Txh-1 is referred to as a second drive width Wt2.

In the present embodiment, the drive width Wt in the first direction X of the sensor drive electrode Tx is the same as the first width Wca of the corresponding first electrode Ca. For example, the first drive width Wt1 is the same as the first width Wca1. In addition, the second drive width Wt2 is the same as the first width Wca2. The first drive width Wt1 is smaller than the second drive width Wt2.

Side edges of the first electrodes Ca1 and Cak on the edges on the non-display area NDA side, of the common electrode CE, are arranged at positions overlaid on boundaries B between the display area DA and the non-display area NDA, in the example illustrated. However, displacement in bonding of the first substrate SUB1 and the second substrate SUB2 often occurs in the structure in which the common electrode CE is disposed on the first substrate SUB1 and the light-shielding layer BM is disposed on the second substrate SUB2 as explained above. For this reason, the side edges of the first electrodes Ca1 and Cak are not necessarily in line with the boundaries B, and may be displaced toward the display area DA side or the non-display area NDA side from the boundaries B, by a distance corresponding to the displacement in bonding of the substrates.

Each detection electrode Rx comprises the expanded portion RSL and the body portion RR connected to each other.

The expanded portion RSL is electrically connected to the lead line L. In addition, the expanded portion RSL is not overlaid on the non-display area NDA and is disposed in the display area DA, in planar view. The expanded portion RSL is overlaid on the first electrode Ca1 on the edge or the first electrode Cak on the edge alone, of the first electrodes Ca. In the example illustrated, the side edge of the expanded portion RSL on the non-display area NDA side is located in the boundary B. The expanded portion RSL is located in a longitudinally elongated area extending in the second direction Y and has a first width Ws1 in the second direction Y.

The body portion RR is formed in a strip shape to have an end portion linked to the expanded portion RSL and is disposed in the display area DA. In the display area DA, the body portion RR is opposed to the common electrode CE. The body portion RR is located in a laterally elongated area extending in the first direction X. In the present embodiment, the body portion RR includes two split portions (slimline) RR1 and RR2 with a slit interposed between the split portions. Each of the split portions RR1 and RR2 is formed in a strip shape and extends in the first direction X. The number of the split portions of the body portion RR is not limited to two, but may be one or three or more. In addition, the shape and the size of the body portion RR are not particularly limited but can be variously changed.

The split portion RR1 has a second width Wr1 in the second direction Y. The split portion RR2 has a second width Wr2 in the second direction Y. A body width Wr is a sum of the second width Wr1 and the second width Wr2 (Wr=Wr1+Wr2). In the present embodiment, the body width Wr is uniform over the entire display area DA. Each of the second widths Wr1 and Wr2 is uniform over the entire display area DA. The body width Wr is smaller than the first width Ws1. In other words, the expanded portion RSL is wider than the body portion RR.

In the example illustrated, the expanded portion RSL is connected to two split portions RR1 and RR2 arranged in the second direction Y. In addition, the expanded portion RSL is arranged with the body portion RR in the first direction X to project from both sides of the body portion RR in the second direction Y.

When several parts of the detection electrode Rx illustrated (i.e., the single split portion RR1 and the single expanded portion RSL) are noticed, the detection electrode Rx is substantially shaped in the letter T. The detection electrodes Rx on the opposite side of the display area DA (not shown) are formed in the same shape, and one of the detection electrodes Rx is substantially shaped in the letter I.

In the present embodiment, the body portion RR and the expanded portion RSL of the detection electrodes Rx is composed of a connection line CP and detection line LB. The connection line CP and the detection line LB are metallic. The connection line CP and the detection line LB can adopt a structure of depositing a metal and a transparent conductive coating such as ITO or the like. The connection line CP connects the expanded portion RSL and the lead line L. All the detection lines LB are disposed in the display area DA. Group of the detection lines LB is connected an end side of the connection line CP and an end side of the other connection line CP, and substantially extends in the first direction X. In the example illustrated, each of the detection lines LB has a grating (mesh) shape. Each of segments forming the grating extends in a direction different from the first direction X and the second direction Y. As the detection lines LB, a first detection line LB1 forming the expanded portion RSL and a second detection line LB2 forming the split portions RR1 and RR2 are formed integrally.

The shape of the detection lines LB is not limited to grating but can be variously modified. For example, the detection electrode Rx may be formed of detection lines having a shape of a waveform (more specifically, a triangular waveform). The shape of the expanded portions RSL of the detection electrode Rx is not limited to the linear waveform, but can also be a circular waveform of a sine wave or the like. In other words, desirably, protruding portions and recess portions may be engaged at edge portions of the expanded portions RSL adjacent in the second direction Y, and their boundary may not be thereby formed in a straight line.

An interval between the adjacent detection lines LB is remarkably small, an electric field hardly leaks from a small space surrounded by the detection lines (i.e., a small space shaped in a diamond, in the present embodiment) and is caught by the detection lines LB. From this viewpoint, the following explanations are based on an assumption that the body portions RR and the expanded portion RSL of the detection electrode Rx are in a strip shape which does not generate an electric field (or leakage of electric field) penetrating these portions, at a central portion and an edge portion.

The first width Ws1 of the expanded portion RSL corresponds to a distance of the first detection line LB1 in the second direction Y. Each of the second width Wr1 and the second width Wr2 corresponds to a distance of the second detection line LB2 in the second direction Y. In addition, the region of the expanded portion RSL is not the only region overlaid on the first detection line LB1, but corresponds to the region surrounded by a two-dot-chained line in the figure, and the first detection line LB1 extends to the two-dot-chained line. The regions of the split portions RR1 and RR2 are not the only regions overlaid on the second detection line LB2, but correspond to the regions surrounded by two-dot-chained lines in the figure, and the second detection line LB2 extends to the two-dot-chained lines.

In the display area DA, dummy electrodes DR are disposed between the adjacent split portions RR1 and RR2, and between the adjacent body portions RR. Each of the dummy electrodes DR is formed of segments corresponding to the detection lines LB. For example, the segments of the dummy electrode DR are arranged in a grating shape and spaced apart. The dummy electrode DR is not connected to the lines such as the lead lines L or the detection lines LB, and is in an electrically floating status. In the example illustrated, the dummy electrodes DR are disposed between the adjacent body portions RR and between the split portions RR1 and RR2, and are not disposed between the adjacent expanded portions RSL.

The detection electrodes Rx are arranged in the second direction Y. The expanded portions RSL of the detection electrodes Rx arranged in the second direction Y are disposed to be adjacent to each other. In other words, in each detection electrode Rx, the segments of the detection lines LB constituting the expanded portion RSL are arranged at substantially regular intervals. The dummy electrode DR is not interposed between one of the expanded portions and the other expanded portion. The segments of the respective detection lines LB are arranged in the second direction Y at substantially regular intervals. The leakage of the electric field from the region between the expanded portions RSL is suppressed by disposing the detection lines LB as explained above.

The expanded portions RSL constituting the expanded portion group SR are physically separated from each other, but the detection lines LB are disposed as explained above. For this reason, the expanded portion group SR can exert an electric field blocking function of substantially blocking the electric field without gaps in the entire region along a boundary between the display area DA and the first area A1 and the entire region along a boundary between the display area DA and the second area A2. An electric line of force is not extracted from the display area DA to the first area A1 and the second area A2 but is caught by any one of the expanded portions RSL, and an electric field is formed between the expanded portion RSL and the common electrode CE.

In other words, the electrostatic capacitance is formed between the common electrode CE and the expanded portion RSL, through the gap between the body portions RR and the gap between the split portions RR1 and RR2. As a result, formation of the capacitance between the common electrode CE and the lead lines L through the gaps can be suppressed. For example, since formation of the capacitance can be suppressed between portions located at gaps between the detection electrodes Rx of the common electrode CE and the lead lines L connected to detection electrodes different from the detection electrodes Rx, a detection error of the sensor SE can be suppressed.

Figure 7:
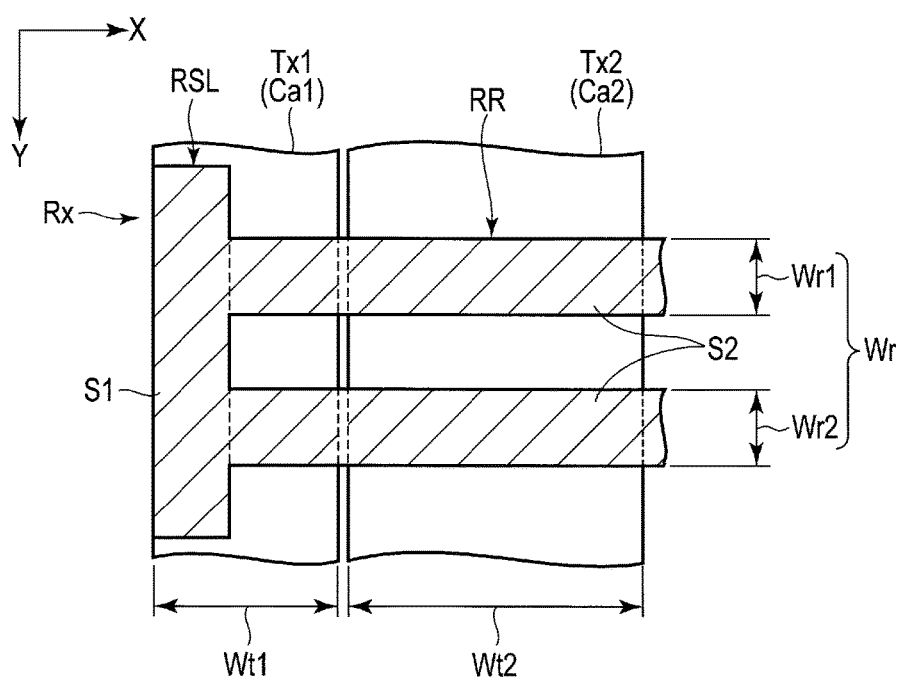
FIG. 7 is another enlarged plan view showing the sensor in part.

FIG. 7 is another enlarged plan view showing a part of the sensor SE shown in FIG. 5.

As shown in FIG. 7, an area in which the first sensor drive electrode Tx1 is opposed to the detection electrodes Rx in planar view is referred to as first area S1. An area in which the second sensor drive electrode Tx2 is opposed to the detection electrodes Rx in planar view is referred to as second area S2. It should be noted that an area in which the h-th sensor drive electrode Txh is opposed to the detection electrodes Rx in planar view is also the first area S1 and that an area in which each of the third sensor drive electrode Tx3 to the h-1-th sensor drive electrode Txh-1 is opposed to the detection electrodes Rx in planar view is also the second area S2.

In the present embodiment, the first area S1 is slightly larger than the second area S2. In the present embodiment, however, the body width Wr is uniform over the entire display area DA. In the sensor drive electrode Tx, the first drive width Wt1 is set to be smaller than the second drive width Wt2. The first area S1 can be made to close to the second area S2 and the difference between the first area S1 and the second area S2 can be reduced as compared with an assumption that the first drive width Wt1 is equal to the second drive width Wt2. The first area S1 can be made to be equal to the second area S2 by making the first drive width Wt1 further smaller, unlike the present embodiment. In this case, the difference between the first area S1 and the second area S2 becomes zero.

Figure 8:
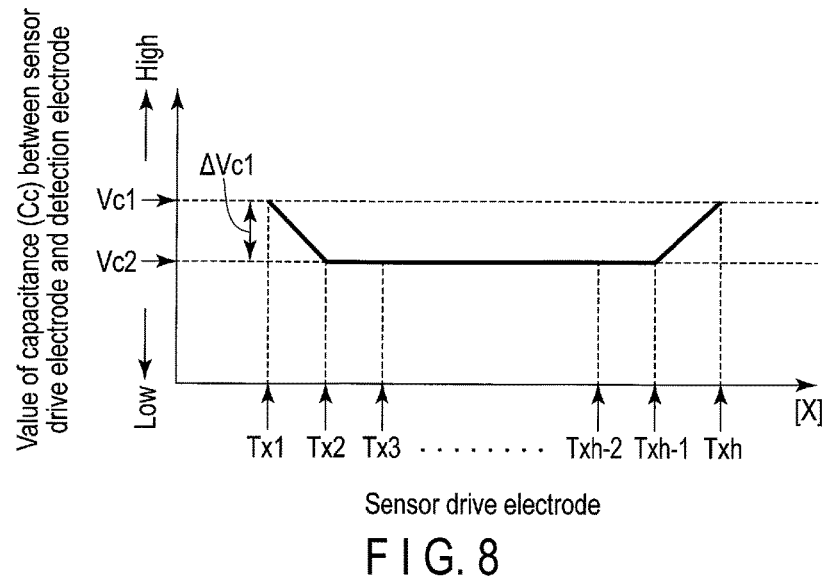
FIG. 8 is a line graph representing a value of capacitance between a sensor drive electrode and a detection electrode, in each sensor drive electrode of the first embodiment.

FIG. 8 is a line graph representing a value of capacitance Cc between the sensor drive electrodes Tx and the detection electrodes Rx, in each sensor drive electrode Tx.

As shown in FIG. 8, the value of capacitance Cc between the sensor drive electrode Tx and the detection electrodes Rx is proportional to the area in which the sensor drive electrode Tx is overlapped to the detection electrodes Rx. The value of the capacitance Cc between each of the second sensor drive electrode Tx2 to the h-1-th sensor drive electrode Txh-1 and the detection electrodes Rx is uniform, i.e., Vc2. In contrast, the value of the capacitance Cc between each of the first sensor drive electrode Tx1 and the h-th sensor drive electrode Txh, and the detection electrodes Rx is uniform, i.e., Vc1 greater than the capacitance value Vc2. In the present embodiment, however, since the absolute value of the difference between the first area S1 and the second area S2 is reduced as explained above, capacitance difference ΔVc1 which is the absolute value of the difference between the capacitance value Vc2 and the capacitance value Vc1 is also reduced.

When a finger or the like contacts or approaches the input surface of the liquid crystal display device DSP, variation in the capacitance generated at the detection electrodes Rx can hardly be made relatively small by suppressing the irregularity of the capacitance Cc as explained above.

With reference to the above matters, in the present embodiment, irregularity of the capacitance Cc on the entire regions of the sensor SE is suppressed by physical means of making the widths of the driving electrodes Tx for the first electrodes Ca on the edges different from those for the first electrodes Ca at positions other than the edges. As a result, the sensor SE capable of exactly detecting input position information is formed.

Figure 9:
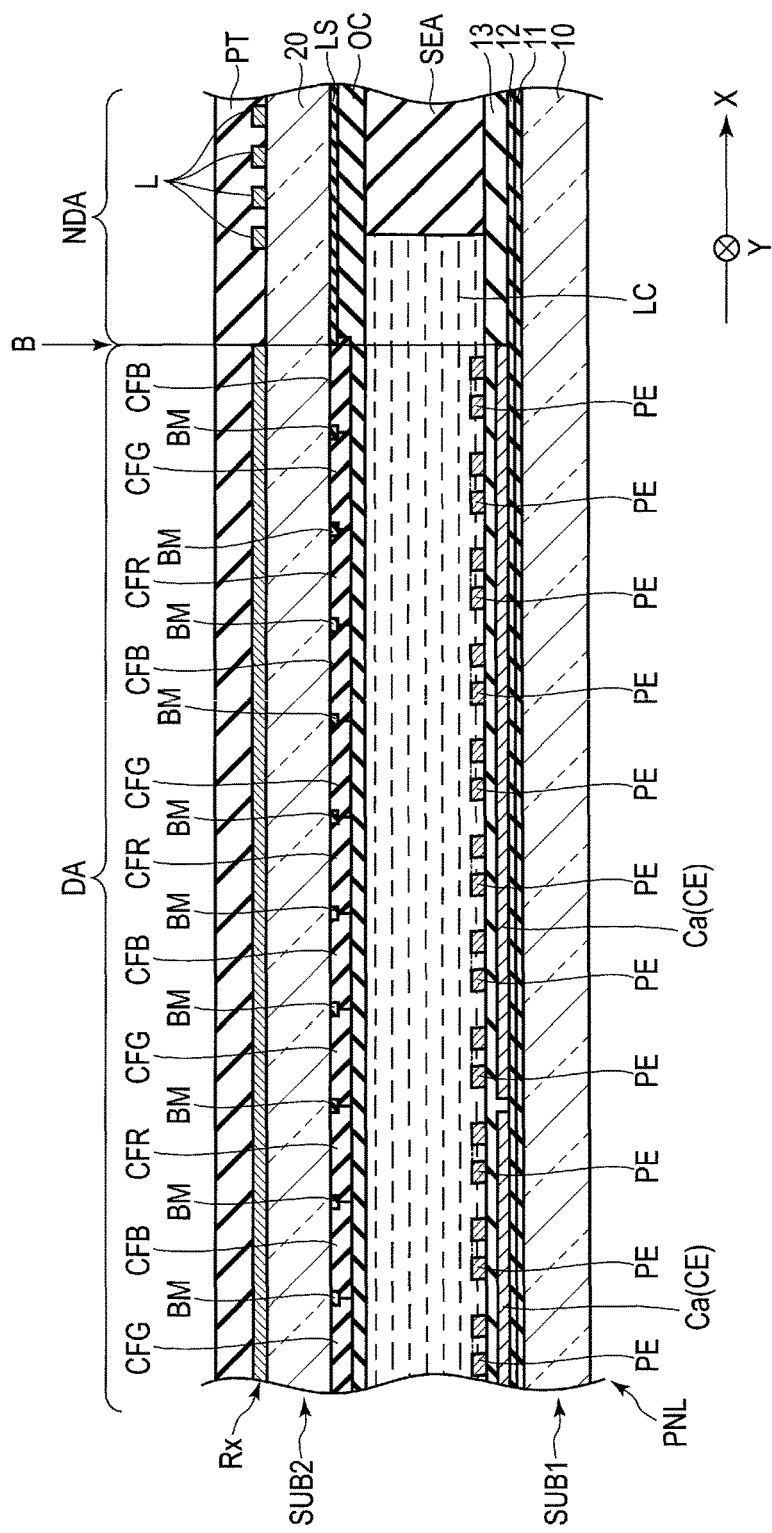
FIG. 9 is a cross-sectional view showing a structure of a display panel including the sensor in part.

FIG. 9 is a cross-sectional view showing a structure of the display panel PNL including several parts of the sensor SE. The main portions alone necessary for explanations are shown in the figure.

As shown in FIG. 9, a frame-shaped sealing member SEA is disposed in a region which becomes the non-display area NDA in planar view, between the first substrate SUB1 and the second substrate SUB2. The liquid crystal layer LC is sealed in a space surrounded by the first substrate SUB1, the second substrate SUB2 and the sealing member SEA. The common electrode CE and the pixel electrodes PE are located on an inner surface side of the first substrate SUB1 which is opposed to the second substrate SUB2. The common electrode CE is located on the second insulating film 12 and covered with the third insulating film 13. The pixel electrodes PE are located on the third insulating film 13 and are opposed to the common electrode CE. The number of the pixel electrodes PE located just above the common electrode CE is not limited to this. Illustration of various lines such as a source line and the first alignment film are omitted.

The light-shielding layer BM, the color filters CFR, CFG and CFB, the overcoat layer OC, and a peripheral light-shielding layer LS are located on an inner surface side of the second substrate SUB2 which is opposed to the first substrate SUB1. In the display area DA, the color filters CFR, CFG and CFB are opposed to each pixel electrode PE. The light-shielding layer BM is located at each of boundaries of the color filters CFR, CFG and CFB. In the non-display area NDA, the peripheral light-shielding layer LS is located on the inner surface of the second insulating substrate 20. The peripheral light-shielding layer LS can be formed of the same material as the light-shielding layer BM. The overcoat layer OC extends over the display area DA and the non-display area NDA. Illustration of the second alignment film is omitted.

The detection electrodes Rx and the lead lines L are located on the outer surface side of the second substrate SUB2, which is opposite to the side opposed to the first substrate SUB1. The detection electrodes Rx and the lead lines L can be formed of the same material, for example, a metallic material such as aluminum (Al), titanium (Ti), silver (Ag), molybdenum (Mo), tungsten (W), copper (Cu) or chromium (Cr) or an alloy using the metallic materials. Each of the detection electrodes Rx and the lead lines L may be a single-layer body of the metallic material or a laminate body formed by stacking layers of the metallic materials. Furthermore, each of the detection electrodes Rx and the lead lines L may be formed of an assembly of a single-layer body or laminate body of the metallic material and a transparent conductive coating of ITO or the like.

A sealing member SEA is disposed under the lead lines L. The detection electrode Rx located in the display area DA is formed of the untransparent metallic material but does not remarkably reduce the transmittance of each pixel since the detection electrode Rx is composed of, for example, the detection lines LB formed of wires having a width of approximately 3 to 5 μm. In addition, since each of the detection lines LB is formed of a wire extending in a direction different from the directions of alignment of the pixels (i.e., the first direction X and the second direction Y) as shown in FIG. 6, moire of the pixel layout is suppressed and the deterioration in display quality is also suppressed.

A protective film PT is further disposed on the outer surface side of the second substrate SUB2. The protective film PT covers the detection electrode Rx and the lead lines L. The protective film PT is formed of, for example, a transparent resin material or a transparent inorganic material.

Next, operations of a display period of displaying an image at the liquid crystal display device DSP having the above-explained configuration will be explained.

First, an off status in which no fringe field is formed in the liquid crystal layer LC will be explained. The off status is a status in which a potential difference is not formed between the pixel electrode PE and the common electrode CE. In the off status, liquid crystal molecules contained in the liquid crystal layer LC are subjected to initial alignment in one orientation in the X-Y plane by the alignment restriction force between the first alignment film AL1 and the second alignment film AL2.

The light from the backlight unit BL is partially transmitted through the polarizer of the first optical element OD1 and is made incident on the display panel PNL. The light made incident on the display panel PNL is the linearly polarized light which is orthogonal to an absorption axis of the polarizer. The polarized status of the linearly polarized light hardly changes when the linearly polarized light passes though the display panel PNL in the off status. For this reason, most of the linearly polarized light which has passed through the display panel PNL is absorbed by the polarizer of the second optical element OD2 (black display). In other words, the light from the backlight unit BL does not contribute to the display, and a black screen is displayed in the display area DA. A mode of displaying the black screen on the display panel PNL in the off status is called a normally black mode.

Next, the on status in which the fringe field is formed in the liquid crystal layer LC will be explained. The on-status corresponds to a status in which a potential difference is formed between the pixel electrode PE and the common electrode CE. In the on status, the common drive signal is supplied from the common electrode driver CD to the common electrodes CE. On the other hand, a video signal to form the potential difference for the common potential is supplied to the pixel electrode PE. The fringe field is thereby formed between the pixel electrodes PE and the common electrodes CE.

In the on-status, the liquid crystal molecules are aligned in an orientation different from an orientation of the initial alignment within X-Y plane due to the fringe field formed within the liquid crystal layer LC. The linearly polarized light orthogonal to the absorption axis of the polarizer of the first optical element OD1 is made incident on the display panel PNL and the polarized status is varied in response to the alignment status of the liquid crystal molecules when passing through the liquid crystal layer LC. For this reason, at least part of the light which has passed through the liquid crystal layer LC is transmitted through the polarizer of the second optical element OD2, in the on status (white display). In the above-explained display modes, vicinity to the edges of the pixel electrodes PE mainly contributes to the display since the fringe field is formed along the edges of the pixel electrodes PE.

Next, an operation in a sensing period for detecting the contact or approach of an object in the liquid crystal display device DSP will be explained.

The sensor drive signal is supplied from the common electrode driver CD to the sensor drive electrode Tx. Sensing is performed in such a situation. A principle in an example of a sensing method will be explained with reference to FIG. 10.

Figure 10:
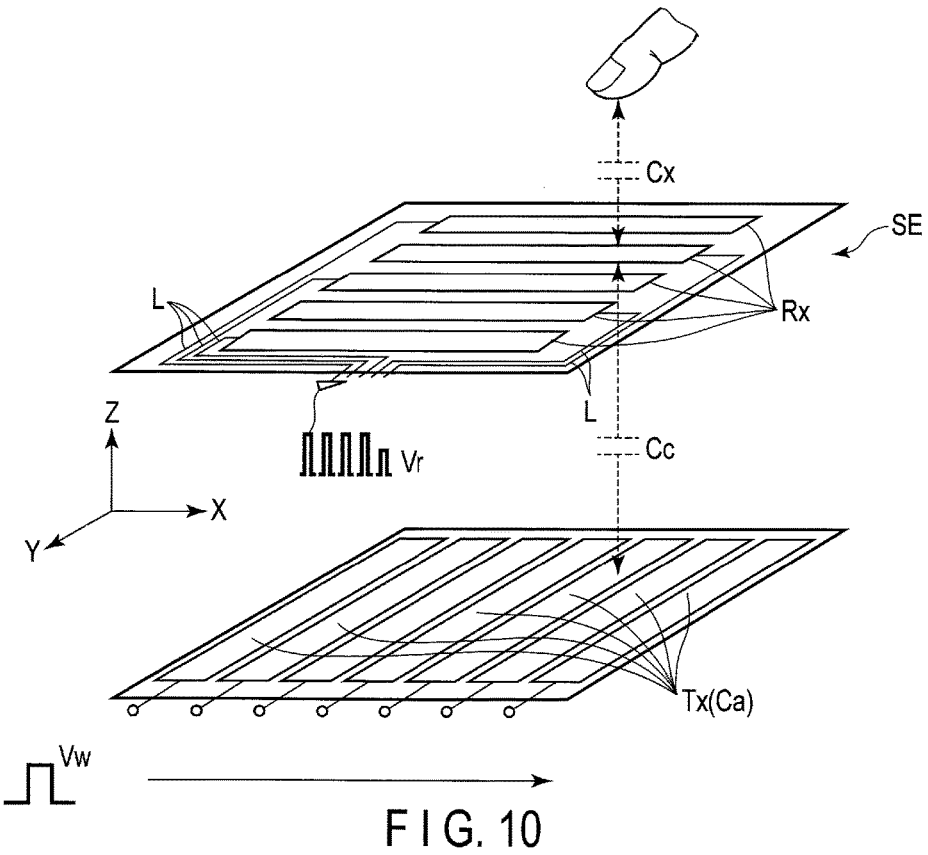
FIG. 10 is an illustration for explanation of a principle of a sensing method.

As shown in FIG. 10, the capacitance Cc exists between the sensor drive electrodes Tx and the detection electrodes Rx. Pulse-like write signals (sensor drive signals) Vw are sequentially supplied to the sensor drive electrodes Tx in a predetermined cycle. In this example, a finger of a user is assumed to be close to a position at which a specific detection electrode Rx and a specific sensor drive electrode Tx intersect. A capacitance Cx is generated by the detected object close to the detection electrode Rx. When the pulse-like write signal Vw is supplied to the sensor drive electrode Tx, a pulse-like read signal (sensor output value) Vr lower in level than pulses obtained from the other detection electrodes can be obtained from the specific detection electrode Rx.

The detection circuit RC shown in FIG. 5 can detect two-dimensional position information of the detected object in the X-Y plane of the sensor SE, based on the timing of supplying the write signal Vw to the sensor drive electrode Tx and the read signal Vr from each detection electrode Rx. In addition, the capacitance Cx obtained when the detected object is close to the detection electrode Rx is different from that obtained when the detected object is remote from the detection electrode Rx. For this reason, the level of the read signal Vr obtained when the detected object is close to the detection electrode Rx is different from that obtained when the detected object is remote from the detection electrode Rx. Therefore, the detection circuit RC can also detect the proximity of the detected object to the sensor SE (i.e., a distance in a third direction Z from the sensor SE), based on the level of the read signal Vr.

The sensor-equipped liquid crystal display device DSP of the first embodiment configured as explained above comprises the first electrodes Ca, the display panel PNL including the detection electrodes Rx and the lead lines L, and the controller. The first electrodes Ca are disposed in the display area DA and arranged in the first direction X to be spaced apart by gaps, and each of the first electrodes Ca extends in the second direction Y. Each of the detection electrodes Rx comprises the body portion RR and the expanded portion RSL. The body portion RR is opposed to the first electrodes Ca. The expanded portion RSL is opposed to the first electrode Ca1 (or the first electrode Cak) on the edge, of the first electrodes Ca, connected to the body portion RR, and is wider than the body portion RR. The lead lines L are disposed in the non-display area NDA and are electrically connected to the expanded portions RSL.

Each of the first electrodes Ca constitutes one corresponding sensor drive electrode Tx. The first drive width Wt1 of each of the first sensor drive electrode Tx1 and the h-th sensor drive electrode Txh, of the sensor drive electrodes Tx, is smaller than the second drive width Wt2 of each of the second sensor drive electrode Tx2 to the h-1-th sensor drive electrode Txh-1. For this reason, even when the sensor SE uses the expanded portions RSL to suppress leakage of the electric field, variation in the capacitance Cc over the entire regions of the sensor SE can be suppressed while reducing the area of the frame region.

In the present embodiment, the body width Wr of the body portion RR in the second direction Y is uniform over the entire display area DA. The second drive width Wt2 of each of the second sensor drive electrode Tx2 to the h-1-th sensor drive electrode Txh-1 is uniform. For this reason, the second area S2 in which each of the second sensor drive electrode Tx2 to the h-1-th sensor drive electrode Txh-1 is opposed to the detection electrodes Rx is uniform. For this reason, variation in the capacitance Cc can be further suppressed.

With reference to the above matters, the sensor-equipped liquid crystal display device DSP capable of accurately detecting input position information can be obtained.

(Comparative Example of First Embodiment)

Next, the sensor-equipped liquid crystal display device DSP of a comparative example of the first embodiment will be explained. FIG. 11 is an enlarged plan view showing a part of the sensor SE of the sensor-equipped liquid crystal display device of the comparative example.

As shown in FIG. 11, the present comparative example is different from the first embodiment with respect to features that the first width Wca is the same on the first electrodes Ca on the edges and the first electrodes Ca at positions other than the edges, and that the number of the first electrodes Ca and driving electrodes Tx is an odd number.

The drive width Wt of each of odd-numbered sensor drive electrodes Tx, of the sensor drive electrodes Tx, is uniform and the same as the second drive width Wt2 of the first embodiment. For this reason, the area in which each of the sensor drive electrodes Tx at positions other than the edges, of the odd-numbered sensor drive electrodes Tx, is opposed to the detection electrodes Rx, is uniform and the same as the second area S2 of the first embodiment. It should be noted that the sensor SE of the present comparative example is not configured to make the area in which each of the sensor drive electrodes Tx on the edges is opposed to the detection electrodes Rx, closer to the area in which each of the sensor drive electrodes Tx at positions other than the edges is opposed to the detection electrodes Rx.

In addition, the drive width Wt of each of even-numbered sensor drive electrodes Tx, of the sensor drive electrodes Tx, is uniform and smaller than the drive width Wt of each of the odd-numbered sensor drive electrodes Tx. In the present comparative example, the drive width Wt of each of the even-numbered sensor drive electrodes Tx is shorter than the drive width Wt of each of the odd-numbered sensor drive electrodes Tx by one pixel or 30 to 60 µm. For this reason, the sensor SE of the present comparative example is not configured to make the area in which each of the odd-number sensor drive electrodes Tx at positions other than the edges is opposed to the detection electrodes Rx and the area in which each of the even-numbered sensor drive electrodes Tx is opposed to the detection electrodes Rx uniform.

FIG. 12 is a line graph representing a value of capacitance Cc between the sensor drive electrode Tx and the detection electrodes Rx, in each sensor drive electrode Tx of the comparative example.

As shown in FIG. 12, the value of the capacitance Cc between each of the odd-numbered the sensor drive electrodes Tx at positions other than the edges and the detection electrodes Rx is a uniform value, i.e., Vc2. In contrast, the value of the capacitance Cc between each of the even-numbered sensor drive electrodes Tx and the detection electrodes Rx is uniform, i.e., Vc3 smaller than the capacitance value Vc2. For this reason, capacitance difference ΔVc2, which is an absolute value of the difference between the capacitance value Vc2 and the capacitance value Vc3, is consequently generated in the present comparative example.

The value of the capacitance Cc between each of the first sensor drive electrode Tx1 and the h-th sensor drive electrode Txh on the edges and the detection electrodes Rx is uniform, i.e., Vc4 greater than the capacitance value Vc1 also shown in FIG. 8. For this reason, capacitance difference ΔVc3, which is an absolute value of the difference between the capacitance value Vc2 and the capacitance value Vc4, is consequently greater than the capacitance difference ΔVc1.

With reference to the above matters, variation in the capacitance generated at the detection electrodes Rx may be relatively small in the comparative example. In other words, irregularity of the capacitance Cc on the entire regions of the sensor SE can hardly be suppressed and processing of accurately detecting the input position information is further required, and these elements are disadvantageous from the viewpoint of the detection time and the power consumption.

(Second Embodiment)

Figures 13, 14:
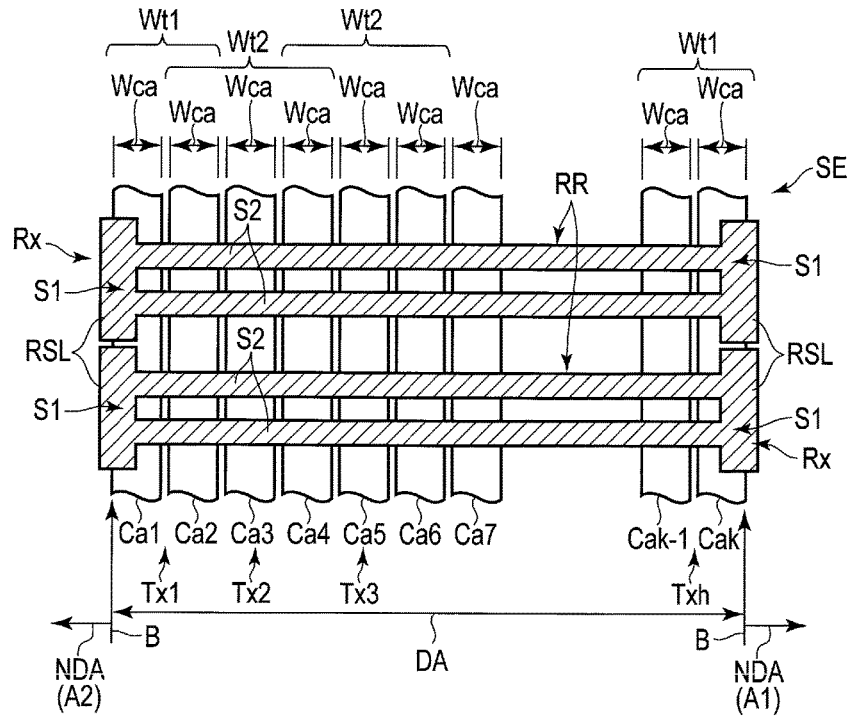
FIG. 13 is an enlarged plan view showing a sensor in part of a sensor-equipped liquid crystal display device of a second embodiment.
FIG. 14 is a table showing a relationship between a first electrode and a sensor drive electrode, of the second embodiment.

Next, a sensor-equipped liquid crystal display device DSP of a second embodiment will be explained in detail. FIG. 13 is an enlarged plan view showing several parts of a sensor SE of the sensor-equipped liquid crystal display device DSP of the present embodiment.

As shown in FIG. 13, the present embodiment is different from the first embodiment with respect to features that a first width Wca is uniform in first electrodes Ca on the edges and first electrodes at positions other than the edges, that the number of the first electrodes Ca is an odd number, that expanded portions RSL are also disposed in a non-display area NDA, and that each of sensor drive electrodes Tx is formed on the first electrodes Ca.

The first width Wca of each of the odd-numbered first electrodes Ca, of the first electrodes Ca, is uniform. In addition, the first width Wca of each of even-numbered first electrodes Ca, of the first electrodes Ca, is uniform and smaller than the first width Wca of each of the odd-numbered first electrodes Ca. In the present embodiment, the first width Wca of each of the even-numbered first electrodes Ca is shorter than the first width Wca of each of the odd-numbered first electrodes Ca by one pixel or 30 to 60 µm.

The expanded portions RSL are disposed on the display area DA and the non-display area NDA across boundaries B. The left expanded portion RSL of each of the detection electrodes Rx is opposed to a second region A2 and a first electrode Ca1 on the edge. The right expanded portion RSL of each of the detection electrodes Rx is opposed to a first region A1 and a first electrode Cak on the edge. In the present embodiment, too, area of a frame region can be reduced while suppressing leakage of an electric field since at least several parts of the expanded portions RSL are disposed in the display area DA.

A relationship between the first electrodes Ca and the sensor drive electrodes Tx in the present embodiment will be explained with reference to FIG. 14. In the table, symbol ○ represents the first electrode Ca forming each of the sensor drive electrodes Tx.

As shown in FIG. 14, the first electrodes Ca are bundled and driven. Adjacent first electrodes Ca are simultaneously supplied with sensor drive signals from a controller, and the first electrodes Ca constitute the sensor drive electrode Tx obtained by bundling the adjacent first electrodes. A first sensor drive electrode Tx1 and an h-th sensor drive electrode Txh are the sensor drive electrodes on the edges, and each of them is composed of i first electrodes Ca. In this case, i represents a natural number. For this reason, the first sensor drive electrode Tx1 is formed of two or more first electrodes Ca which include the first electrode Ca1 and which are adjacent in the first direction X. Similarly, the h-th sensor drive electrode Txh is formed of two or more first electrodes Ca which include the first electrode Cak and which are adjacent in the first direction X. In the present embodiment, i represents 2 (i=2).

Each of the second sensor drive electrode Tx2 to the h-1-th sensor drive electrode Txh-1 is a sensor drive electrode at a position other than the edges and is formed of j first electrodes Ca adjacent to each other in the first direction X. In this case, j represents a natural number greater than i. For this reason, each of the second sensor drive electrode Tx2 to the h-1-th sensor drive electrode Txh-1 is formed of two or more first electrodes Ca adjacent to each other in the first direction X except the first electrodes Ca on the edges. In the present embodiment, j represents 3 (j=3).

As shown in FIG. 13 and FIG. 14, a second sensor drive electrode Tx2 is formed at a position displaced from the first sensor drive electrode Tx1 in the first direction X. The second sensor drive electrode Tx2 is composed of three adjacent first electrodes Ca. In the second sensor drive electrode Tx2, one or more first electrodes Ca forming the first sensor drive electrode Tx1 are replaced. In addition, the second sensor drive electrode Tx2 comprises one or more first electrodes Ca forming the first sensor drive electrode Tx1.

In the present embodiment, the second sensor drive electrode Tx2 is configured to comprise a first electrode Ca2 used for the first sensor drive electrode Tx1 and to comprise a first electrode Ca3 adjacent to the first electrode Ca2 and a first electrode Ca4.

Each of a third sensor drive electrode Tx3 to the h-1-th sensor drive electrode Txh-1 is also formed at a position displaced similarly from one previous sensor drive electrode Tx in the first direction X. For example, the third sensor drive electrode Tx3 is composed of three adjacent first electrodes Ca. In addition, in the third sensor drive electrode Tx3, one or more first electrodes Ca constituting the second sensor drive electrode Tx2 are replaced. In addition, the third sensor drive electrode Tx3 comprises one or more first electrodes Ca forming the second sensor drive electrode Tx2.

In the present embodiment, the third sensor drive electrode Tx3 is configured to comprise the first electrode Ca4 used for the second sensor drive electrode Tx2 and to comprise a first electrode Ca5 adjacent to the first electrode Ca4 and a first electrode Ca6. For this reason, with reference to the unit of the first electrodes Ca, each of the third sensor drive electrode Tx3 to the h-1-th sensor drive electrode Txh-1 is constituted by bundling three first electrodes Ca and displaced in the first direction X by two first electrodes Ca.

Since each of the second sensor drive electrode Tx2 to the h-1-th sensor drive electrode Txh-1 is constituted by bundling three first electrodes Ca as explained above with reference to FIG. 13, the second drive width Wt2 of these sensor drive electrodes is approximately the same. In the present embodiment, each of the second sensor drive electrode Tx2 to the h-1-th sensor drive electrode Txh-1 is constituted by two even-numbered first electrodes Ca and one odd-numbered first electrode Ca. For this reason, the second drive width Wt2 of the present embodiment is completely the same. Since each of the first sensor drive electrode Tx1 and the h-th sensor drive electrode Txh on the both edges is constituted by bundling two first electrodes Ca, the first drive width Wt1 of these sensor drive electrodes is smaller than the second drive width Wt2.

In the present embodiment, too, an area in which each of the first sensor drive electrode Tx1 and the h-th sensor drive electrode Txh is opposed to the detection electrodes Rx is referred to as first area S1 in planar view. An area in which each of the second sensor drive electrode Tx2 to the h-1-th sensor drive electrode Txh-1 is opposed to the detection electrodes Rx is referred to as second area S2.

As explained above, the second drive width Wt2 of each of the second sensor drive electrode Tx2 to the h-1-th sensor drive electrode Txh-1 is uniform. In the present embodiment, too, the body width Wr of the body portion RR in the second direction Y is uniform over the entire display area DA. For this reason, the second area S2 in which each of the second sensor drive electrode Tx2 to the h-1-th sensor drive electrode Txh-1 is opposed to the detection electrodes Rx is uniform.

In the present embodiment, the first area S1 is slightly larger than the second area S2. In the present embodiment, however, the first area S1 can be made to close to the second area S2 and the difference between the first area S1 and the second area S2 can be reduced as compared with an assumption that each of the first sensor drive electrode Tx1 and the h-th sensor drive electrode Txh is formed by bundling three first electrodes Ca. For this reason, the first area S1 can be made to be equal to the second area S2 and the difference between the first area S1 and the second area S2 can be reduced to zero in accordance with conditions concerning the sensor SE.

In the present embodiment, irregularity of the capacitance Cc is suppressed by reducing the difference between the first area S1 and the second area S2. As a result, when a finger or the like contacts or approaches the input surface of the liquid crystal display device DSP, variation in the capacitance generated at the detection electrodes Rx can hardly be made relatively small.

With reference to the above matters, the magnitude of the widths of the sensor drive electrodes Tx on the both edges in the sensing period is substantially changed by changing the number of the bundled first electrodes Ca and driving the sensing, in the present embodiment. Then, driving processing of reducing the difference between the first area S1 and the second area S2 is performed. In the present embodiment, too, irregularity of the capacitance Cc on the entire regions of the sensor SE is thereby suppressed and the liquid crystal display device DSP capable of accurately detecting the input position information is formed.

It should be noted that i and j can be variously modified and that i is not limited to 2 and j is not limited to 3. In addition, the first electrodes Ca used by the sensor drive electrodes Tx may not be overlapped, unlike the present embodiment. For this reason, the sensor drive electrodes Tx may be displayed in the first direction X.

Next, a method of driving the liquid crystal display device DSP of the present embodiment will be explained.

An example of performing sensing drive during successive display drive at plural times will be explained. It should be noted that one display drive indicates display drive in at least one horizontal scanning period, which drives at least pixels PX in a row arranged in the first direction X.

Figure 15:
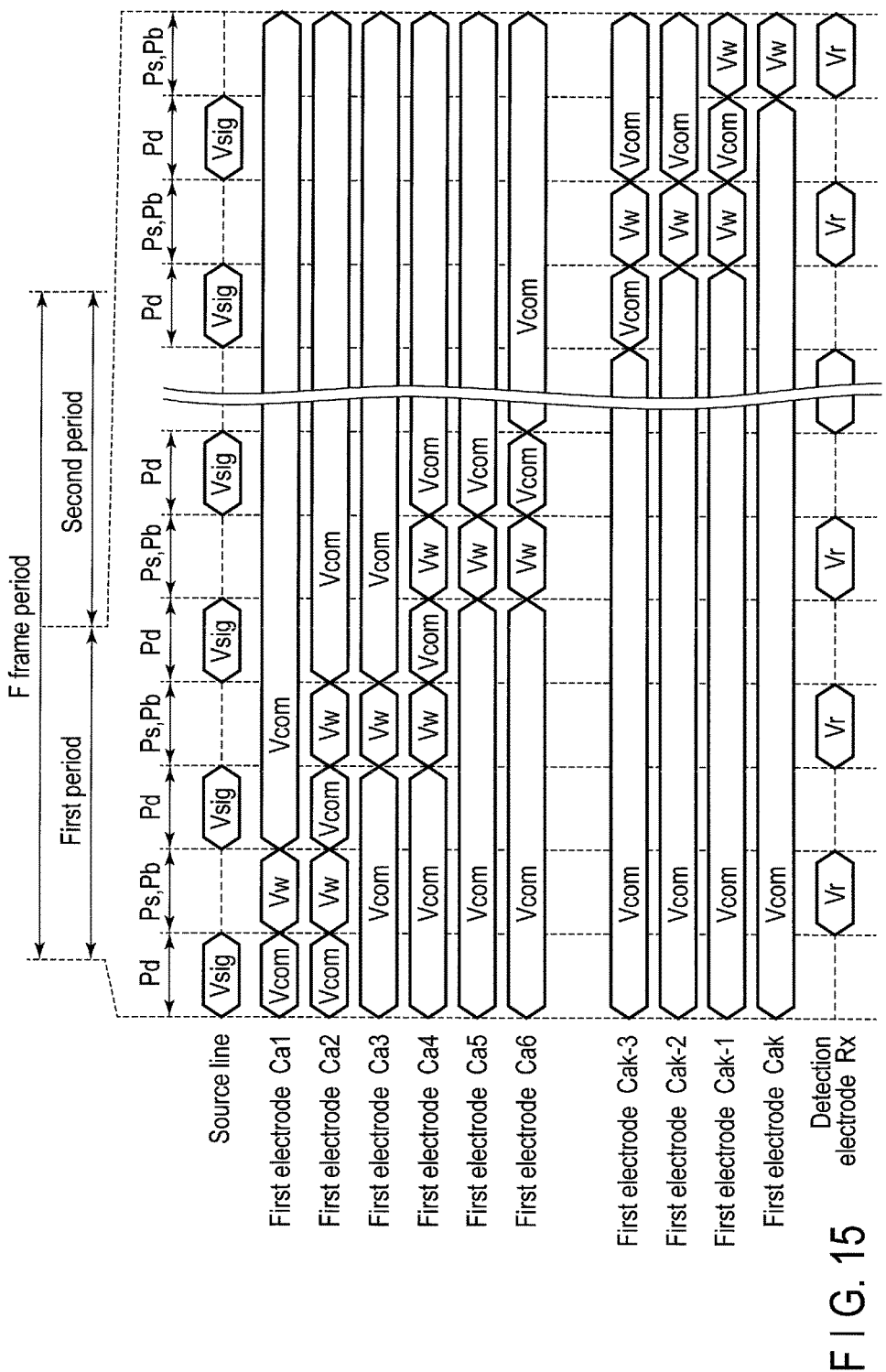
FIG. 15 is a timing chart for explanation of a method of driving the sensor-equipped liquid crystal display device of the second embodiment, illustrating a video signal, a common drive signal, and a write signal, in a first period of an F-th frame period.

FIG. 15 is a timing chart for explanation of a method of driving the liquid crystal display device DSP of the present embodiment, illustrating a video signal Vsig, a common drive signal Vcom, and a write signal Vw, in a first period of an F-th frame period.

As shown in FIG. 15, the F frame period which is the F-th frame period is, for example, one sixtieth second. The F frame period is divided into two periods, i.e., a first period and a second period following the first period. Each of the first period and the second period is a half of the frame period. In the present embodiment, reading the read signal Vr from one detection electrode Rx is completed in the first period. Driving of the first period will be explained here.

In the first period, a controller (driver IC chip IC1, driver IC chip IC2, and control module CM) repeats display drive performed during each of display periods Pd and sensing drive performed during sensing periods Ps other than the display period. The sensing periods Ps are, for example, blanking periods Pb. In addition, in each sensing period Ps, a write signal Vw can be written to one sensor drive electrode Tx and a read signal Vr can be read from the detection electrode Rx.

In each display period Pd, the source line driver SD outputs the video signal Vsig to the source lines S and the common electrode driver CD supplies the common drive signal Vcom to the common electrode (first electrodes Ca), under control of the driver IC chip IC1. The video signal is thereby written to each of the pixels and the display is implemented. In the display period Pd, the detection electrodes Rx are set in, for example, an electrically floating status.

Figure 16:
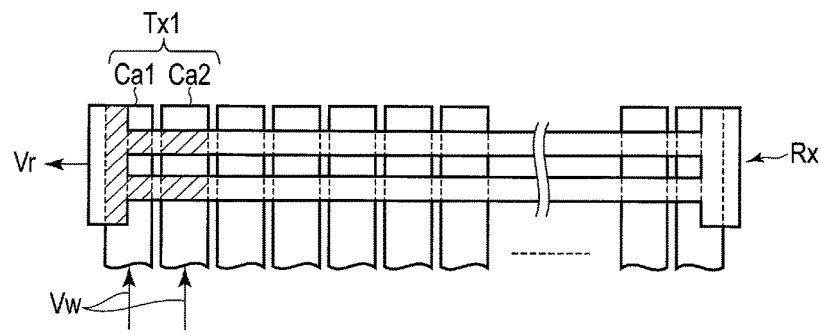
FIG. 16 is a plan view showing a sensor in part, for explanation of an example of the method of driving the sensor of the second embodiment.

As shown in FIG. 15 and FIG. 16, the driver IC chip IC1 drives the first sensor drive electrode Tx1 in a first sensing period Ps of the first period. More specifically, the common electrode driver CD writes write signals (sensor drive signals) Vw to the first electrode Ca1 and the first electrode Ca2. The driver IC chip IC2 reads the read signals Vr from the detection electrodes Rx. In other words, the input position information can be taken from the detection electrodes Rx. The read signals Vr are signals indicating variation in sensor signals generated between the first sensor drive electrode Tx1 and the detection electrodes Rx, based on the write signals Vw. In FIG. 16 or FIG. 17 to FIG. 19, hatch lines are drawn in regions in which the sensor drive electrodes Tx to write the signals and the detection electrodes Rx to read the signals are opposed.

Figure 17:
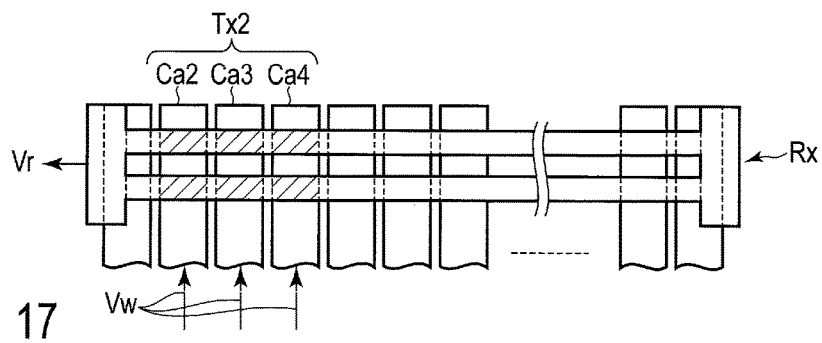
FIG. 17 is a plan view showing a sensor in part, for explanation of an example of the method of driving the sensor of the second embodiment, subsequently with FIG. 16.

Then, as shown in FIG. 15 and FIG. 17, the driver IC chip IC1 drives the second sensor drive electrode Tx2 in a second sensing period Ps of the first period. More specifically, the common electrode driver CD writes the write signals (sensor drive signals) Vw to the first electrode Ca2, the first electrode Ca3 and the first electrode Ca4. The driver IC chip IC2 reads the read signals Vr from the detection electrodes Rx. The read signals Vr are signals indicating variation in sensor signals generated between the second sensor drive electrode Tx2 and the detection electrodes Rx, based on the write signals Vw. The first electrode Ca2 is commonly used in the first sensing period Ps and the second sensing period Ps.

Figure 18:
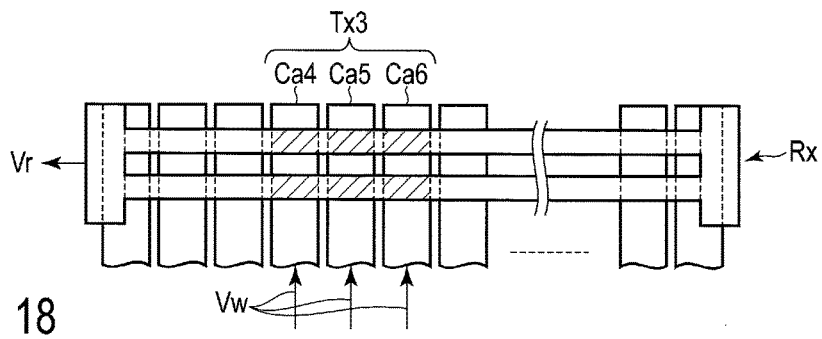
FIG. 18 is a plan view showing a sensor in part, for explanation of an example of the method of driving the sensor of the second embodiment, subsequently with FIG. 17.

Then, as shown in FIG. 15 and FIG. 18, the driver IC chip IC1 drives the third sensor drive electrode Tx3 in a third sensing period Ps of the first period. More specifically, the common electrode driver CD writes the write signals (sensor drive signals) Vw to the first electrode Ca4, the first electrode Ca5 and the first electrode Ca6. The driver IC chip IC2 reads the read signals Vr from the detection electrodes Rx. The read signals Vr are signals indicating variation in sensor signals generated between the third sensor drive electrode Tx3 and the detection electrodes Rx, based on the write signals Vw. The first electrode Ca4 is commonly used in the second sensing period Ps and the third sensing period Ps.

After that, in the fourth sensing period Ps to the h-1-th sensing period Ps, of the first period, too, the write signals Vw are written and the read signals Vr are read similarly to the second and third sensing periods Ps.

Figure 19:
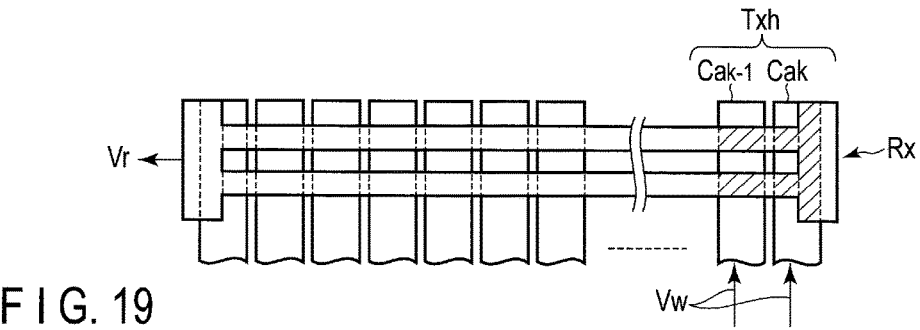
FIG. 19 is a plan view showing a sensor in part, for explanation of an example of the method of driving the sensor of the second embodiment, subsequently with FIG. 18.

Then, as shown in FIG. 15 and FIG. 19, the driver IC chip IC1 drives the h-th sensor drive electrode Txh in an h-th sensing period Ps of the first period. More specifically, the common electrode driver CD writes the write signals (sensor drive signals) Vw to the first electrode Cak-1 and the first electrode Cak. The driver IC chip IC2 reads the read signals Vr from the detection electrodes Rx. The read signals Vr are signals indicating variation in sensor signals generated between the h-th sensor drive electrode Txh and the detection electrodes Rx.

As explained above, driving of the first period is performed. The input position information can be detected on the entire regions of the display area DA by performing the sensing drive while replacing the detection electrodes Rx to read the signals.

The display periods Pd and the sensing periods Ps are repeated in the present embodiment (FIG. 15) but setting of these periods is not limited to the present embodiment and can be variously modified. For example, each of the display period and the sensing period may be combined to one period in the first period.

The sensor-equipped liquid crystal display device DSP of the second embodiment configured as explained above comprises the first electrodes Ca, the display panel PNL including the detection electrodes Rx and the lead lines L, and the controller. Since each of the first sensor drive electrode Tx1 and the h-th sensor drive electrode Txh is opposed to the expanded portions RSL, the sensor drive electrode is formed by bundling two first electrodes Ca. Since each of the second sensor drive electrode Tx2 to the h-1-th sensor drive electrode Txh-1 is not opposed to the expanded portions RSL but to the split portions alone, the sensor drive electrode is formed by bundling three first electrodes Ca.

The first drive width Wt1 of each of the first sensor drive electrode Tx1 and the h-th sensor drive electrode Txh, of the sensor drive electrodes Tx, is smaller than the second drive width Wt2 of each of the second sensor drive electrode Tx2 to the h-1-th sensor drive electrode Txh-1. For this reason, the same advantages as those of the first embodiment can be obtained in the present embodiment.

With reference to the above matters, the sensor-equipped liquid crystal display device DSP capable of accurately detecting input position information can be obtained.

(Third Embodiment)

Next, a sensor-equipped liquid crystal display device DSP of a third embodiment will be explained. FIG. 20 is a plan view showing a configuration of a sensor SE of the sensor-equipped liquid crystal display device DSP of the present embodiment. The main portions alone necessary for explanations are shown in the figure.

As shown in FIG. 20, the present embodiment is different from the first embodiment (FIG. 5) with respect to features that the number of first electrodes Ca and driving electrodes Tx is an odd number, that a common electrode CE comprises not only k first electrodes Ca1 to Cak, but also two second electrodes Cb1 and Cb2, and that expanded portions RSL are opposed to the second electrodes Cb1 and Cb2.

The second electrode Cb1 is disposed at an edge portion of a display area DA and extends in the second direction Y. More specifically, the second electrode Cb1 is adjacent to the first electrode Ca1 on the edge located on the outermost side of the first electrodes Ca but is spaced apart from the electrode in the first direction X. The second electrode Cb2 is constituted similarly. For this reason, the electrodes on the edges are not the first electrodes Ca1 and Cak, but the second electrodes Cb1 and Cb2, in the common electrode CE.

In the present embodiments, first widths Wca2 of the respective first electrodes Ca2 to Cak-1 are second drive widths Wt2 and are the same as each other. First widths Wca1 of the respective first electrodes Ca1 and Cak are first drive widths Wt1 and are the same as each other, and each of the width is smaller than the first width Wca2. Second widths Wcb of the respective second electrodes Cb1 and Cb2 in the first direction X are the same as each other, and each of the width is smaller than the first width Wca1. In addition, the second width Wcb is smaller than a width of the first direction X of the expanded portion RSL. The second width Wcb is an interval between long sides of the strip-shaped second electrodes Cb and is constant along a length direction of the second electrodes Cb.

Body portions RR of the detection electrodes Rx are opposed to the first electrodes Ca1 to Cak but are not opposed to the second electrodes Cb1 and Cb2. Expanded portions RSL of the detection electrodes Rx are opposed to at least the second electrodes Cb. In the present embodiment, the entire bodies of the expanded portions RSL are disposed in the display area DA. The left expanded portion RSL is opposed to both the first electrode Ca1 and the second electrode Cb1. The right expanded portion RSL is opposed to both the first electrode Cak and the second electrode Cb2.

The sensor-equipped liquid crystal display device DSP of the present embodiment is configured as explained above.

In the display period, the controller (driver IC chip IC1) supplies the same common drive signal Vcom as the signal supplied to the first electrodes Ca1 to Cak to each of the second electrodes Cb1 and Cb2. The controller (driver IC chip IC1) maintains an electric potential of each of the second electrodes Cb1 and Cb2 at a value different from the electric potentials of the sensor drive electrodes Tx, in the sensing period.

For example, the controller maintains the second electrode Cb at the ground potential in the sensing period. Alternatively, the controller changes the second electrode Cb to an electrically floating status in the sensing period. Alternatively, the controller supplies the common drive signal Vcom to the second electrode Cb in the sensing period. The controller may drive the second electrode Cb to be at a desired potential in the sensing period in a case other than the above.

With reference to the above matters, the second electrodes Cb are used for display drive and are not substantially used for sensing drive.

In the present embodiment, the first area S1 is made close to the second area S2 by a combination of physical means of making the first widths Wca of the first electrodes Ca1 and Cak on the edges different from those of the first electrodes Ca2 to Cak-1 at positions other than the edges with a driving method of not using the second electrodes Cb for the sensor drive electrodes Tx. Irregularity of the capacitance Cc on the entire regions of the sensor SE is thereby suppressed and the sensor SE capable of accurately detecting the input position information is formed.

The sensor-equipped liquid crystal display device DSP of the third embodiment configured as explained above comprises the first electrodes Ca, two second electrodes Cb, the display panel PNL including the detection electrodes Rx and the lead lines L, and the controller. Since each of the first sensor drive electrode Tx1 and the h-th sensor drive electrode Txh is opposed to the expanded portions RSL, the first drive width Wt1 of each of the first sensor drive electrode Tx1 and the h-th sensor drive electrode Txh is smaller than the second drive width Wt2 of each of the second sensor drive electrode Tx2 to the h-1-th sensor drive electrode Txh-1. In addition, the sensor drive electrodes Tx are formed without using the second electrodes Cb. For this reason, the same advantages as those of the first embodiment can be obtained in the present embodiment.

In the sensing period, the second electrodes located between the sensor drive electrodes Tx and the lead lines L function as shielding electrodes. For this reason, a parasitic capacitance between the sensor drive electrodes Tx and the lead lines L can be reduced even in a configuration in which the sensor drive electrodes Tx and the lead lines L are disposed to be close to each other. An operation error of the sensor SE resulting from the capacitive coupling between the sensor drive electrodes Tx and the lead lines L can be therefore suppressed. The electric potentials of the second electrodes Cb in the sensing period are not limited to the above example if the parasitic capacitance between the sensor drive electrodes Tx and the lead lines L can be reduced.

In addition, the second electrodes Cb are disposed in the display area DA and function similarly to the first electrodes Ca in the display period. For this reason, in the present embodiment, a space for disposing the second electrodes Cb does not need to be secured in the non-display area NDA and the frame regions can be made narrower, as compared with a case where the second electrodes Cb are disposed in the non-display area NDA. Furthermore, the second electrodes Cb can be disposed on the second insulating film 12 together with the first electrodes Ca. For this reason, the second electrodes Cb can be formed of the same material as the first electrodes Ca in the same process, and a specific process for forming the second electrodes Cb can be unnecessary.

With reference to the above matters, the sensor-equipped liquid crystal display device DSP capable of accurately detecting input position information can be obtained.

(Fourth Embodiment)

Next, a sensor-equipped liquid crystal display device DSP of a fourth embodiment will be explained. FIG. 21 is a plan view showing a configuration of a sensor SE of the sensor-equipped liquid crystal display device DSP of the present embodiment. The main portions alone necessary for explanations are shown in the figure.

As shown in FIG. 21, the present embodiment is different from the third embodiment (FIG. 20) with respect to features that expanded portions RSL are opposed to second electrodes Cb1 and Cb2 but are not opposed to first electrodes Ca, and that a first drive width Wt1 is the same as a second drive width Wt2. A first area S1 is equal to a second area S2, and a difference between the first area S1 and the second area S2 is zero.

In addition, a second width Wcb is equal to a width of the first direction X of the expanded portion RSL. The first drive width Wt1 and the second drive width Wt2 can easily be made the same as each other by using the second electrodes Cb1 and Cb2 similarly to the present embodiment.

Figures 22, 24:
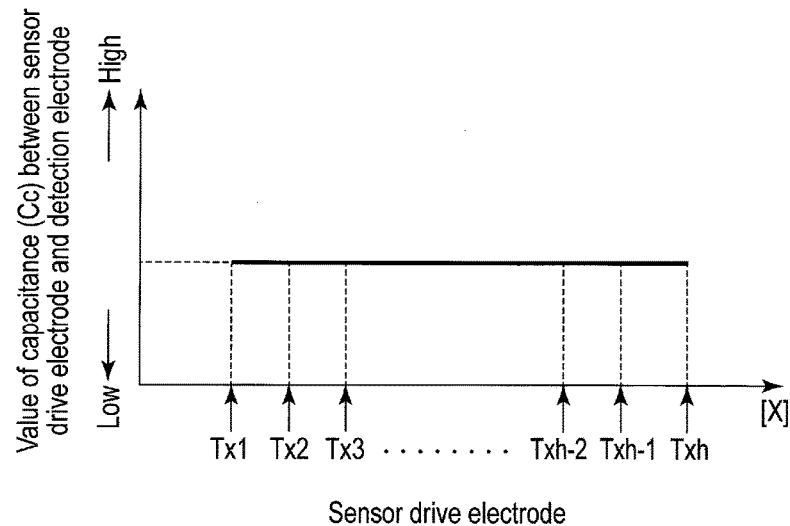
FIG. 22 is a line graph representing a value of capacitance between a sensor drive electrode and a detection electrode, in each sensor drive electrode of the fourth embodiment.
FIG. 24 is a table showing a relationship among a first electrode, a second electrode and a sensor drive electrode, of the fifth embodiment.

FIG. 22 is a line graph representing a value of capacitance Cc between sensor drive electrodes Tx and the detection electrodes Rx, in each sensor drive electrode Tx.

As shown in FIG. 22, a value of a capacitance Cc between each of the first sensor drive electrode Tx1 to the h-th sensor drive electrode Txh, and the detection electrodes Rx is uniform. When a finger or the like contacts or approaches the input surface of the liquid crystal display device DSP, variation in the capacitance generated at the detection electrodes Rx can hardly be made relatively small by canceling the irregularity of the capacitance Cc as explained above.

With reference to the above-explained matters, the first area S1 is made equal to the second area S2 by a combination of physical means for urging the expanded portions RSL to be opposed to the second electrodes Cb1 and Cb2 alone and not to be opposed to the first electrodes Ca with a driving method of not using the second electrodes Cb for the sensor drive electrodes Tx, in the present embodiment. Irregularity of the capacitance Cc on the entire regions of the sensor SE is thereby prevented and the sensor SE capable of accurately detecting the input position information is formed.

In the sensor-equipped liquid crystal display device DSP of the fourth embodiment configured as described above, too, the same advantages as those obtained in the third embodiment can be obtained.

With reference to the above matters, the sensor-equipped liquid crystal display device DSP capable of accurately detecting input position information can be obtained.

(Fifth Embodiment)

Next, a sensor-equipped liquid crystal display device DSP of a fifth embodiment will be explained. FIG. 23 is an enlarged plan view showing several parts of the sensor SE of the sensor-equipped liquid crystal display device DSP of the present embodiment.

As shown in FIG. 23, the present embodiment is different from the second embodiment with respect to features that a common electrode CE comprises not only k first electrodes Ca1 to Cak, but also two second electrodes Cb1 and Cb2 and that expanded portions RSL are opposed to the second electrodes Cb1 and Cb2.

The second electrode Cb1 is disposed at an edge portion of a display area DA to extend in the second direction Y, and is adjacent to and spaced apart from the first electrode Ca1 in the first direction X. Similarly to this, the second electrode Cb2 is disposed at an edge portion of the display area DA to extend in the second direction Y, and is adjacent to and spaced apart from the first electrode Cak in the first direction X.

In the present embodiment, first widths Wca of the respective first electrodes Ca1 to Cak are the same as each other. Second widths Wcb of the respective second electrodes Cb1 and Cb2 are the same as each other, and each of the width is smaller than the first width Wca. In addition, the second width Wcb is smaller than a width of the first direction X of the expanded portion RSL.

The left expanded portion RSL of each of the detection electrodes Rx is opposed to a second region A2, the second electrode Cb1 and the first electrode Ca1. The right expanded portion RSL of each of the detection electrodes Rx is opposed to a first region A1, the second electrode Cb2 and the first electrode Cak.

A relationship among the first electrodes Ca, the second electrode Cb, and the sensor drive electrodes Tx in the present embodiment will be explained with reference to FIG. 24. In the table, symbol ○ represents the first electrode Ca forming each of the sensor drive electrodes Tx.

As shown in FIG. 24, each of the first sensor drive electrode Tx1 and the h-th sensor drive electrode Txh is a sensor drive electrode on the edge and is formed of i first electrodes Ca. In the present embodiment, i represents 2. Each of the first sensor drive electrode Tx1 and the h-th sensor drive electrode Txh is formed of two first electrodes Ca including the first electrode Ca on the edge.

Each of the second sensor drive electrode Tx2 to the h-1-th sensor drive electrode Txh-1 is a sensor drive electrode at a position other than the edges, and is formed of j first electrodes Ca adjacent to each other in the first direction X. In the present embodiment, j represents 3. Each of the second sensor drive electrode Tx2 to the h-1-th sensor drive electrode Txh-1 is formed of three first electrodes Ca adjacent to each other in the first direction X except the first electrodes Ca on the edges. The second electrode Cb does not form the sensor drive electrode Tx.

As shown in FIG. 23 and FIG. 24, the second sensor drive electrode Tx2 is formed at a position displaced from the first sensor drive electrode Tx1 in the first direction X. In the present embodiment, the second sensor drive electrode Tx2 is configured to comprise a first electrode Ca2 used for the first sensor drive electrode Tx1 and to comprise a first electrode Ca3 adjacent to the first electrode Ca2 and a first electrode Ca4.

Each of a third sensor drive electrode Tx3 to a h-1-th sensor drive electrode Txh-1 is also formed at a position displaced similarly from one previous sensor drive electrode Tx in the first direction X. For example, of three first electrodes Ca forming the third sensor drive electrode Tx3, two electrodes are replaced and one electrode is overlapped in three first electrodes Ca forming the second sensor drive electrode Tx2. For this reason, with reference to the unit of the first electrodes Ca, each of the third sensor drive electrode Tx3 to the h-1-th sensor drive electrode Txh-1 is formed by bundling three first electrodes Ca and displaced in the first direction X by two first electrodes Ca.

Since each of the second sensor drive electrode Tx2 to the h-1-th sensor drive electrode Txh-1 is formed by bundling three first electrodes Ca as explained above with reference to FIG. 23, the second drive width Wt2 of these sensor drive electrodes is the same. Since each of the first sensor drive electrode Tx1 and the h-th sensor drive electrode Txh is formed by bundling two first electrodes Ca, the first drive width Wt1 of these sensor drive electrodes is smaller than the second drive width Wt2.

As explained above, all the second drive widths Wt2 are uniform. In the present embodiment, too, the body width Wr of the body portion RR in the second direction Y is uniform over the entire display area DA. For this reason, the second area S2 in which each of the second sensor drive electrode Tx2 to the h-1-th sensor drive electrode Txh-1 is opposed to the detection electrodes Rx is uniform.

In the present embodiment, the first area S1 is slightly larger than the second area S2. In the present embodiment, however, the first area S1 can be made to close to the second area S2 and the difference between the first area S1 and the second area S2 can be reduced as compared with an assumption that each of the first sensor drive electrode Tx1 and the h-th sensor drive electrode Txh is formed by bundling three first electrodes Ca. For this reason, the first area S1 can be made to be equal to the second area S2 in accordance with conditions concerning the sensor SE.

With reference to the above matters, the liquid crystal display device DSP capable of suppressing irregularity of the capacitance Cc on the entire regions of the sensor SE and accurately detecting the input position information is formed by a combination of a driving method of performing sensing drive by changing the number of the bundled first electrodes Ca with another driving method of not using the second electrodes Cb for the sensor drive electrodes Tx, in the present embodiment. In the present embodiment, too, i and j can be variously modified, and the first electrodes Ca used by the sensor drive electrodes Tx may not be overlapped.

The method of driving the liquid crystal display device DSP of the second embodiment can be used as a method of driving the liquid crystal display device DSP of the present embodiment. However, the second electrodes Cb are added to the liquid crystal display device DSP of the present embodiment. For this reason, the controller (driver IC chip IC1) supplies the same common drive signal Vcom as the signal supplied to the first electrodes Ca1 to Cak to each of the second electrodes Cb1 and Cb2 in the display period. Then, the controller (driver IC chip IC1) maintains an electric potential of each of the second electrodes Cb1 and Cb2 at a value different from the electric potentials of the sensor drive electrodes Tx, in the sensing period. With reference to the above matters, the second electrodes Cb are used for display drive and are not substantially used for sensing drive.

According to the sensor-equipped liquid crystal display device DSP of the fifth embodiment configured as described above, the liquid crystal display device DSP broadly corresponds to a combination of the second embodiment with the third embodiment. For this reason, the advantages of both the second embodiment and the third embodiment can be obtained in the present embodiment.

With reference to the above matters, the sensor-equipped liquid crystal display device DSP capable of accurately detecting input position information can be obtained.

(Modified Example 1 of Embodiments)

Next, the sensor-equipped liquid crystal display device DSP of modified example 1 of the embodiments will be explained. Modified example 1 is different from the above-described embodiments with respect to a feature that each of first electrodes Ca of a common electrode CE extends in the first direction X and detection electrodes Rx substantially extend in the second direction Y. The sensor-equipped liquid crystal display device DSP of modified example 1 of the first embodiment will be hereinafter explained.

As shown in FIG. 25, the common electrode CE includes first electrodes Ca which are arranged in the second direction Y to be spaced apart from each other and which extend substantially linearly in the first direction X, in the display area DA. The detection electrodes Rx are arranged in first direction X to be spaced apart from each other and extend substantially linearly in the second direction Y, in the display area DA. The common electrode CE and the detection electrodes Rx are opposed to each other while sandwiching various dielectrics as described above. Each of the first electrodes Ca is electrically connected to a common electrode driver CD. The lead lines L are disposed in the non-display area NDA and are electrically connected to the detection electrodes Rx in a one-to-one relationship. The lead lines L are disposed on, for example, the second substrate SUB2 similarly to the detection electrodes Rx. Each of the lead lines L is electrically connected to the detection circuit RC via the flexible printed circuit FPC2. In the example illustrated, the lead lines L are disposed in the third area A3 of the second substrate SUB2 on which the flexible printed circuit FPC2 is mounted.

Each detection electrode Rx comprises a body portion RR located in the display area DA, and an expanded portion RSL connected to the body portion RR and located at least partially in the display area DA, though not described here. In the example illustrated, the expanded portions RSL are located on the third area A3 side from the body portions RR, and the entire regions of the expanded portions RSL are located in the display area DA. The expanded portions RSL of the respective detection electrodes Rx are arranged in the first direction X to constitute an expanded portion group SR. As explained above, the adjacent expanded portions RSL are configured to suppress leakage of the electric field, though illustrated simply.

In modified example 1, too, the same advantage as that obtained in the above examples can be obtained. In addition, the length of the lead lines L making connection between the detection electrodes Rx and the flexible printed circuit FPC2 can be reduced and the noise of the lead lines L can be further reduced, as compared with the examples shown in FIG. 5 and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number, size, and shape and the like of the first electrodes Ca are not limited specifically and can be variously changed.

The driver IC chip IC1 and the driver IC chip IC2 may be formed integrally. In other words, the driver IC chip IC1 and the driver IC chip IC2 can be integrated in a single driver IC chip. In this case, the single driver IC chip may be capable of driving the display panel PNL and the sensor SE, and detecting the position information from the sensor SE.

The above-explained controller is not limited to the driver IC chips IC1 and IC2 and the control module CM but can be variously modified, may be a unit capable of electrically controlling the display panel PNL and the sensor SE.

Figure 26:
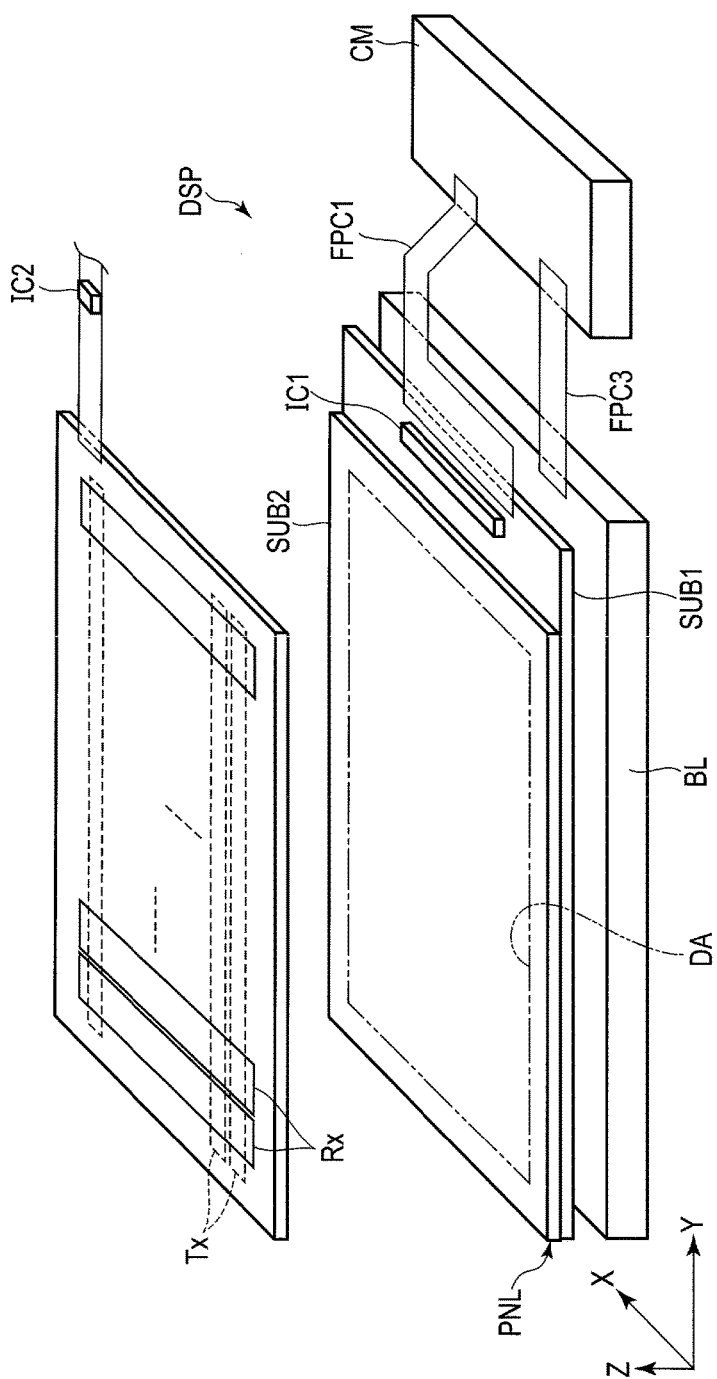
FIG. 26 is a perspective view showing the configuration of the sensor-equipped liquid crystal display device of modified example 2 of the first embodiment.

The sensor-equipped display device in which the common electrode CE built in the display panel PNL functions as the sensor drive electrode and which comprises the detection electrodes Rx opposed to the sensor drive electrode and the lead lines L electrically connected to the detection electrodes Rx, has been explained in the above embodiments, but the embodiments can also be applied to a sensor device which can be combined with a display panel including no sensor elements such as the sensor drive electrode and the detection electrodes by sticking or the other manner, as shown in FIG. 26. More specifically, the sensor device is configured to comprise a sensor panel including a sensor drive electrode, detection electrodes and lead lines, and a controller.

The sensor drive electrode is disposed at a position opposed to the display area of the display device. The detection electrodes are opposed to the sensor drive electrode. The lead lines are disposed at positions opposed to the non-display area of the display device and electrically connected with the detection electrodes to allow the sensor output value to be output from the detection electrodes. The driving module supplies the sensor drive signal to the sensor drive electrode and allows the sensor drive signal from the sensor drive electrode to be detected as the detection signal by the detection electrodes to read the variation in the detection signal. In such a sensor device, each of the detection electrodes comprises the body portion and the expanded portion wider than the body portion. The body portion is opposed to the sensor drive electrode. At least a part of the expanded portion is opposed to the display area and also opposed to the sensor drive electrode. In this sensor device, too, the same advantages as those of the above-explained embodiments can be obtained.

What is claimed is:

1. A sensor-equipped display device comprising:
    first electrodes disposed in a display area, arranged in a first direction and spaced apart from each other, and extending in a second direction intersecting the first direction; and
    a detection electrode comprising a body portion opposed to the first electrodes, and an expanded portion which is opposed to an outermost first electrode of the first electrodes that is located on an outermost side, the expanded portion connected to the body portion and being wider than the body portion,
wherein
a width of the outermost first electrode is smaller than a width of each of one or more other ones of the first electrodes that are opposed to the body portion only.

2. The sensor-equipped display device of claim 1 further comprising:
a pair of substrates;
pixel electrodes disposed in the display area and opposed to the first electrodes; and
a display function layer operated in corresponding with an electric field generated between the first electrodes and the pixel electrodes,
wherein
the first electrodes, the pixel electrodes and the display function layer are located between the pair of substrates.

3. The sensor-equipped display device of claim 2 further comprising:
a controller,
wherein
the controller supplies sensor drive signals to the first electrodes in a detection period, and
the controller supplies common drive signals to the first electrodes and supplies image signals to the pixel electrodes in a display period which is different from the detection period in time sequence.

4. The sensor-equipped display device of claim 1, wherein
the body portion of the detection electrode extends in the first direction, and
a width of the body portion is uniform in all regions of the display area.

5. The sensor-equipped display device of claim 1, wherein
a first area in which the outermost first electrode on the outermost side is opposed to the detection electrode at least including the expanded portion, is similar to a second area in which each of the other first electrodes is opposed to the body portion only.

6. The sensor-equipped display device of claim 1 further comprising:
a second electrode disposed on an edge portion of the display area, and being adjacent to and spaced apart from the outermost first electrode on an edge located on the outermost side,
wherein
the second electrode is opposed to the expanded portion of the detection electrode in the first direction.

7. The sensor-equipped display device of claim 6, wherein
a side of the second electrode which is opposite to another side opposed to the outermost first electrode defines the display area in planar view.

8. The sensor-equipped display device of claim 6 further comprising:
a pair of substrates;
pixel electrodes disposed in the display area and opposed to the first electrodes;
a display function layer operated in corresponding with an electric field generated between the first electrodes and the pixel electrodes; and
a controller,
wherein
the controller supplies sensor drive signals to the first electrodes, and maintains an electric potential of the second electrode at a value different from an electric potential of the first electrodes, in a detection period, and
the controller supplies common drive signals to the first electrodes and the second electrode, and supplies image signals to the pixel electrodes in a display period which is different from the detection period in time sequence.

9. A sensor device comprising:
first electrodes disposed in an area, arranged in a first direction and spaced apart from each other, and extending in a second direction intersecting the first direction; and
a detection electrode comprising a body portion opposed to the first electrodes, and an expanded portion which is opposed to an outermost first electrode of the first electrodes that is located on an outermost side, the expanded portion connected to the body portion and being wider than the body portion,
wherein
a width of the outermost first electrode is smaller than a width of each of one or more other ones of the first electrodes that are opposed to the body portion only.

10. The sensor device of claim 9 further comprising:
a controller,
wherein
the controller supplies sensor drive signals to the first electrodes.

11. The sensor device of claim 9, wherein
the body portion of the detection electrode extends in the first direction, and
a width of the body portion is uniform in all regions of the area.

12. The sensor device of claim 9, wherein
a first area in which the outermost first electrode on the outermost side is opposed to the detection electrode at least including the expanded portion, is similar to a second area in which each of the other first electrodes is opposed to the body portion only.

13. The sensor device of claim 9, further comprising:
a second electrode disposed on an edge portion of the area, and being adjacent to and spaced apart from the outermost first electrode located on an edge located on the outermost side,
wherein the second electrode is opposed to the expanded portion of the detection electrode in the first direction.

* * * * *